(12) United States Patent
Yano et al.

(10) Patent No.: US 7,781,525 B2
(45) Date of Patent: Aug. 24, 2010

(54) CURABLE COMPOSITION

(75) Inventors: Ayako Yano, Takasago (JP); Toshihiko Okamoto, Takasago (JP)

(73) Assignee: Kaneka Corporation, Osaka (JP)

( * ) Notice: Subject to any disclaimer, the term of this patent is extended or adjusted under 35 U.S.C. 154(b) by 30 days.

(21) Appl. No.: 11/794,053

(22) PCT Filed: Dec. 20, 2005

(86) PCT No.: PCT/JP2005/023323

§ 371 (c)(1),
(2), (4) Date: Jun. 22, 2007

(87) PCT Pub. No.: WO2006/070637

PCT Pub. Date: Jul. 6, 2006

(65) Prior Publication Data

US 2008/0188624 A1 Aug. 7, 2008

(30) Foreign Application Priority Data

Dec. 28, 2004 (JP) .............................. 2004-378894

(51) Int. Cl.
C08L 75/02 (2006.01)
C08L 75/04 (2006.01)
C08L 83/12 (2006.01)
C08L 83/16 (2006.01)
C08L 101/10 (2006.01)
C08L 71/02 (2006.01)

(52) U.S. Cl. .................. 525/102; 525/408; 525/411

(58) Field of Classification Search .................. 525/408
See application file for complete search history.

(56) References Cited

U.S. PATENT DOCUMENTS

| | | | |
|---|---|---|---|
| 3,632,557 A | 1/1972 | Brode et al. | |
| 3,857,825 A | 12/1974 | Streck et al. | |
| 3,888,815 A | 6/1975 | Bessmer et al. | |
| 4,449,938 A | 5/1984 | Pollak | |
| 4,507,469 A | 3/1985 | Mita et al. | |
| 4,562,237 A | 12/1985 | Okuno et al. | |
| 4,720,530 A | 1/1988 | Wurminghausen et al. | |
| 4,873,305 A | 10/1989 | Cavezzan et al. | |
| 4,910,255 A | 3/1990 | Wakabayashi et al. | |
| 4,960,844 A | 10/1990 | Singh | |
| 4,977,228 A * | 12/1990 | Wakabayashi et al. ........ 528/12 |
| 5,399,607 A | 3/1995 | Nanbu et al. | |
| 5,639,825 A | 6/1997 | Nanbu et al. | |
| 6,204,350 B1 | 3/2001 | Liu et al. | |
| 6,271,309 B1 | 8/2001 | Roberts et al. | |
| 6,287,701 B1 | 9/2001 | Oochi et al. | |
| 6,350,345 B1 | 2/2002 | Kotani et al. | |
| 6,410,640 B1 | 6/2002 | Fukunaga et al. | |
| 6,569,980 B1 | 5/2003 | Masaoka et al. | |
| 6,642,309 B2 | 11/2003 | Komitsu et al. | |
| 6,703,442 B1 | 3/2004 | Ando et al. | |
| 6,720,373 B2 | 4/2004 | Lin et al. | |
| 7,115,695 B2 | 10/2006 | Okamoto et al. | |
| 2002/0016411 A1 | 2/2002 | Ando et al. | |
| 2002/0086942 A1 | 7/2002 | Fujita et al. | |
| 2002/0115811 A1 | 8/2002 | Huang et al. | |
| 2003/0096904 A1 * | 5/2003 | Hakuta et al. ............... 524/588 |
| 2004/0181025 A1 | 9/2004 | Schindler et al. | |
| 2005/0171315 A1 | 8/2005 | Wakabayashi et al. | |
| 2006/0128919 A1 | 6/2006 | Okamoto et al. | |
| 2006/0199933 A1 | 9/2006 | Okamoto et al. | |
| 2006/0252903 A1 | 11/2006 | Wakabayashi et al. | |
| 2007/0203297 A1 | 8/2007 | Wakabayashi et al. | |
| 2008/0269405 A1 | 10/2008 | Okamoto et al. | |

FOREIGN PATENT DOCUMENTS

| | | |
|---|---|---|
| EP | 0 473 793 A1 | 3/1992 |
| EP | 0 538 881 A2 | 4/1993 |
| EP | 0 546 310 A2 | 6/1993 |
| EP | 0 918 062 A1 | 5/1999 |
| EP | 1 000 980 A1 | 5/2000 |
| EP | 1 024 170 A1 | 8/2000 |
| EP | 1 041 119 A2 | 10/2000 |
| EP | 1 550 700 A1 | 7/2005 |
| JP | 52-73998 A | 6/1977 |
| JP | 55-9669 A | 1/1980 |
| JP | 63-6041 A | 1/1988 |
| JP | 02206665 A * | 8/1990 |
| JP | 0539428 A | 2/1993 |
| JP | 5-117519 A | 5/1993 |
| JP | 6-322251 A | 11/1994 |
| JP | 9-12860 A | 1/1997 |
| JP | 2000-109678 A | 4/2000 |
| JP | 3062626 B2 | 5/2000 |

(Continued)

Primary Examiner—Randy Gulakowski
Assistant Examiner—Mike Dollinger
(74) Attorney, Agent, or Firm—Sughrue Mion, PLLC

(57) ABSTRACT

A curable composition, which comprises: (A) an organic polymer having a reactive silicon-containing group, (B) a carboxylic acid and/or a metal salt of a carboxylic acid, (C) an amine compound having no reactive silicon group, (D) a silane compound substituted with an amino group and (E) a silane compound substituted with an epoxy group, wherein the ratio of the molar number (d) of all amino groups of the silane compound substituted with an amino group (D) contained in the composition to the molar number (e) of all epoxy groups of a silane compound substituted with an amino group (E) contained in the composition (i.e., the ratio of (d)/(e))) is 1 or more, and further the total amount of the component (D) and the component (E) with respect to 100 g of the component (A) is 30 mmol or more. The above curable composition is a curable composition which comprises an organic polymer having a silicon-containing group and being crosslinkable through the formation of a siloxane bonding, and which uses a curing catalyst free of an organotin compound and exhibits good adhesiveness and also stable curability even after it is stored.

7 Claims, No Drawings

FOREIGN PATENT DOCUMENTS

| | | |
|---|---|---|
| JP | 2000-345054 A | 12/2000 |
| JP | 2001-181532 A | 7/2001 |
| JP | 2001-342363 A | 12/2001 |
| JP | 2004-107397 A | 4/2004 |
| JP | 2004-189946 A | 7/2004 |
| JP | 2004315614 A * | 11/2004 |
| WO | 99/48942 A1 | 9/1999 |
| WO | WO 00/56817 A1 | 9/2000 |
| WO | WO 00/56818 A1 | 9/2000 |
| WO | WO 2004/031300 A1 | 4/2004 |

\* cited by examiner

CURABLE COMPOSITION

CROSS REFERENCE TO RELATED APPLICATIONS

This application is a National Stage of International Application No. PCT/JP2005/023323, filed on Dec. 20, 2005, which claims priority based on Japanese Patent Application No. 2004-378894, filed Dec. 28, 2004.

TECHNICAL FIELD

The present invention relates to a curable composition containing an organic polymer having silicon-containing group(s) which have a hydroxyl group or a hydrolyzable group bonded to a silicon atom and can be crosslinked by the formation of a siloxane bond (hereinafter, referred to as a "reactive silicon group" as the case may be).

BACKGROUND ART

It is known that organic polymers each having at least one reactive silicon group in the molecule have a nature that the polymers are each crosslinked by the formation of siloxane bonds together with a hydrolysis reaction of the reactive silicon group or some other reaction with water or the like even at room temperature, so that a rubbery cured product is obtained.

Among these polymers each having a reactive silicon group, organic polymers each having a polyoxyalkylene polymer or an isobutylene polymer as a main chain skeleton have already been industrially produced and have widely been used for the application of sealants, adhesives, paints, and other articles. (Patent Document 1), and (Patent Document 2)

Curing compositions containing these organic polymers each having a reactive silicon group are cured with the use of a silanol condensing catalyst. Usually, organotin catalysts, which have a carbon-tin bond, such as dibutyltin bis(acetylacetonate) have widely been used. However, in recent years, about the organotin compounds, the toxicity thereof has been pointed out. Thus, the development of catalysts free from any organotin compound has been desired.

As such catalysts free from any organotin compound, suggested are catalyst systems wherein various metal salts of carboxylic acids or carboxylic acids are used together with an amine compound. (Patent Document 3), (Patent Document 4), (Patent Document 5), (Patent Document 6), (Patent Document 7), (Patent Document 8), (Patent Document 9), (Patent Document 10), and (Patent Document 11)

On the other hands, since organic polymers each containing at least one reactive silicon group in the molecule are widely used for the application of sealants, adhesives, paints or other articles, the organic polymers are desired to have adhesiveness to various substrates. In order to improve the adhesiveness, a method of adding an amino-group-substituted silane compound is generally known. Known is also a technique of using an epoxy-group-substituted silane compound together in order to cause the polymer to adhere to an adhesion-resistant substrate. (Patent Document 12) and (Patent Document 13)

Patent Document 1: JP-A-52-73998
Patent Document 2: JP-A-63-6041
Patent Document 3: JP-A-55-9669
Patent Document 4: Japanese Patent No. 3062626
Patent Document 5: JP-A-5-117519
Patent Document 6: JP-A-6-322251
Patent Document 7: JP-A-9-12860
Patent Document 8: WO 00-56817
Patent Document 9: WO 04-31300
Patent Document 10: JP-A-2000-345054
Patent Document 11: JP-A-2004-189946
Patent Document 12: WO 00-056818
Patent Document 13: JP-A-2004-107397

DISCLOSURE OF THE INVENTION

Problems to be solved by the invention

In the case of using a catalyst described in the above-mentioned patents, wherein a metal salt of a carboxylic acid or a carboxylic acid is used, there remains a problem that the curability and the adhesiveness tend to be poorer than those in the case of using an organotin catalyst.

It is an object of the invention to provide a curable composition which contains, as a component, an organic polymer having reactive silicon group(s) and which is a one-component curable composition exhibiting a practical adhesiveness with the use of a catalyst that is free from any organotin compound and has a low toxicity and further having a curability unchanged from an initial curability after the composition is stored.

Means for Solving the Problems

As a result of eager investigation for solving such problems, the inventors have found that the adhesiveness to substrates dramatically improve in the case that in a composition containing, as a component, an organic polymer having reactive silicon group(s); a carboxylic acid and/or a metal salt of a carboxylic acid is/are used as a catalyst; an amine compound (C) having no reactive silicon group is added in order to improve the curability to a practical level; an amino-group-substituted silane compound (D) and an epoxy-group-substituted silane compound (E) are used together; and the total molar number of the component (D) and the component (E) is above a certain level. Furthermore, the inventors have found that the curability after storage is good without being changed from the initial value thereof in the case that the molar number (d) of all amino groups of the amino-group-substituted silane compound (D) contained in the composition is equal to or more than the molar number (e) of all epoxy groups of the epoxy-group-substituted silane compound (E) contained in the composition. Thus, the invention has been completed.

Accordingly, the invention is a one-component curable composition, containing (A) an organic polymer having silicon-containing group(s) which can be crosslinked by the formation of a siloxane bond, (B) a carboxylic acid and/or a metal salt of a carboxylic acid, (C) an amine compound having no reactive silicon group, (D) an amino-group-substituted silane compound, and (E) an epoxy-group-substituted silane compound, wherein the ratio of the molar number (d) of all amino groups of the amino-group-substituted silane compound (D) contained in the composition to the molar number (e) of all epoxy groups of the epoxy-group-substituted silane compound (E) contained in the composition (i.e., the ratio of (d)/(e)) is 1 or more, and further the total amount of the component (D) and the component (E) with respect to 100 g of the component (A) is 30 mmol or more.

The main chain skeleton of the organic polymer of the component (A) is preferably at least one polymer selected from the group consisting of polyoxyalkylene polymer, saturated hydrocarbon polymer, and (meth)acrylate polymer. More preferable polyoxyalkylene polymer is polyoxypropylene polymer.

The carboxylic acid and/or the metal salt of a carboxylic acid of the component (B) is/are preferably a carboxylic acid wherein a carbon atom adjacent to a carbonyl group is a quaternary carbon and/or a metal salt of a carboxylic acid wherein a carbon atom adjacent to a carbonyl group is a quaternary carbon. The metal salt of a carboxylic acid, wherein a carbon atom adjacent to a carbonyl group is a quaternary carbon, is more preferably a tin salt of a carboxylic acid wherein a carbon atom adjacent to a carbonyl group is a quaternary carbon.

The amine compound having no reactive silyl group of the component (C) is a component necessary for increasing the activity of the component (B).

The amino-group-substituted silane compound of the component (D) and the epoxy-group-substituted silane compound of the component (E) are components necessary for improving the adhesiveness of the composition to a substrate.

A preferred embodiment of the curable composition according to the invention is a one-component adhesive or a one-component sealant wherein the curable composition described in any one of the above paragraphs is used.

EFFECTS OF THE INVENTION

The curable composition of the invention is a one-component curable composition excellent in adhesiveness and storage stability while the use of a catalyst free from any organotin compound.

BEST MODE FOR CARRYING OUT THE INVENTION

The invention will be described in detail hereinafter.

The main chain skeleton of the organic polymer having reactive silicon group(s), which is used in the present invention, is not particularly limited. Thus, polymers having various main chain skeletons can be used.

Specific examples thereof include polyoxyalkylene polymers such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as ethylene-propylene copolymer, polyisobutylene, copolymer made from isobutylene and isoprene or the like, polychloroprene, polyisoprene, copolymer made from isoprene or butadiene, and acrylonitrile and/or styrene or the like, polybutadiene, copolymer made from isoprene or butadiene, acrylonitrile, and styrene or the like, and hydrogenated polyolefin polymers obtained by hydrogenating these polyolefin polymers; polyester polymers each obtained by condensation of a dibasic acid, such as adipic acid, and glycol, or by ring-opening polymerization of lactones; (meth)acrylate polymers each obtained by radical-polymerizing ethyl (meth)acrylate, butyl (meth)acrylate, or some other monomer; vinyl polymers each obtained by radical-polymerizing a (meth)acrylate monomer, vinyl acetate, acrylonitrile, styrene, or some other monomer; graft polymers each obtained by polymerizing a vinyl monomer in the above-mentioned organic polymers; polysulfide polymers; polyamide polymers, such as nylon 6, which is obtained by the ring-opening polymerization of ε-caprolactam, nylon 6,6, which is obtained by polycondensing hexamethylenediamine and adipic acid, nylon 6,10, which is obtained by polycondensing hexamethylenediamine and sebacic acid, nylon 11, which is obtained by polycondensing ε-aminoundecanoic acid, nylon 12, which is obtained by the ring-opening polymerization of ε-aminolaurolactam, and copolymer nylons each containing two or more components out of the above-mentioned nylons; and a polycarbonate polymer produced by polycondensing, for example, bisphenol A and carbonyl chloride, and a diallyl phthalate polymer.

More preferred are saturated hydrocarbon polymers such as polyisobutylene, hydrogenated polyisoprene and hydrogenated polybutadiene, the polyoxyalkylene polymers, and the (meth)acrylate polymers since they each have a relatively low glass transition temperature and the cured product obtained therefrom is excellent in cold resistance.

The polyoxyalkylene polymers and the (meth)acrylate polymers are particularly preferred, and the polyoxyalkylene polymers are most preferred since the adhesiveness thereof is excellent.

The glass transition temperature of the organic polymer which is the component (A) is not particularly limited, and is preferably 20° C. or lower, more preferably 0° C. or lower, particularly preferably −20° C. or lower. If the glass transition temperature is higher than 20° C., the viscosity becomes high in winter or cold districts so that the workability may deteriorate. Additionally, the flexibility of the cured product lowers so that the elongation thereof may fall. The glass transition temperature is a value obtained by DSC measurement.

Moreover, the polyoxyalkylene polymers and the (meth)acrylate polymers are particularly preferred, and polyoxyalkylene polymers are most preferred since they have high moisture permeability and at the time of making the polymers each into a one-component composition, the composition is excellent in depth curability.

The reactive silicon group contained in the organic polymer of the invention is a group which has hydroxyl groups or hydrolyzable groups bonded to a silicon atom and can be crosslinked by a reaction accelerated with a curing agent. The reactive silicon group may be a group represented by the following general formula (2):

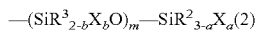
$$—(SiR^3{}_{2-b}X_bO)_m—SiR^2{}_{3-a}X_a \quad (2)$$

wherein $R^2$ and $R^3$ each independently represent an alkyl group having 1 to 20 carbon atoms, an aryl group having 6 to 20 carbon atoms, an aralkyl group having 7 to 20 carbon atoms, or a triorganosiloxy group represented by $(R')_3SiO$, wherein three R's may be the same or different and are each a hydrocarbon group having 1 to 20 carbon atoms; when two or more $R^2$s or $R^3$s are present, they may be the same or different; X represents a hydroxyl group or a hydrolyzable group; when two or more Xs are present, they may be the same or different; a represents 0, 1, 2 or 3 and b represents 0, 1 or 2; bs in the groups $(SiR^3{}_{2-b}X_bO)$ the number of which is m, may be the same or different; m represents an integer of 0 to 19 provided that the following is satisfied: $a+\Sigma b \geq 1$.

Each of the hydrolyzable groups is not particularly limited, and may be a hydrolyzable group conventionally known. Specific examples thereof include hydrogen and halogen atoms; and alkoxy, acyloxy, ketoxymate, amino, amide, acid amide, aminooxy, mercapto, and alkenyloxy groups. Among these groups, preferred are a hydrogen atom and alkoxy, acyloxy, ketoxyamte, amino, amide, aminooxy, mercapto and alkenyloxy groups. The alkoxy groups are particularly preferred since the groups are mild in hydrolyzability so as to be easily handled.

The number of the hydrolyzable group(s) or hydroxyl group(s) which can be bonded to the single silicon atom ranges from 1 to 3. The value of $(a+\Sigma b)$ preferably ranges from 1 to 5. When the number of the bonded hydrolyzable groups or hydroxyl groups in the reactive silicon group is 2 or more, they may be the same or different.

The number of the silicon atoms which form the reactive silicon group is one or more. In the case of silicon atoms bonded through siloxane bonds or the like, the number thereof is preferably 20 or less.

Particularly preferred is a reactive silicon group represented by the following general formula (3) since it is easily available:

  (3)

wherein $R^2$ and X have the same meanings as described above, and c is an integer of 1 to 3.

Specific examples of $R^2$ and $R^3$ in the general formulae (2) and (3) include alkyl groups such as methyl and ethyl groups, cycloalkyl groups such as a cyclohexyl group, aryl groups such as a phenyl group, aralkyl groups such as a benzyl group, and triorganosiloxy groups represented by $(R')_3SiO—$ wherein R' is a methyl group, a phenyl group or the like. Among these groups, a methyl group is particularly preferred.

More specific examples of the reactive silicon group include trimethoxysilyl, triethoxysilyl, triisopropoxysilyl, dimethoxymethylsilyl, diethoxymethylsilyl, and diisopropoxymethylsiyl groups. The trimethoxysilyl, triethoxysilyl, and dimethoxymethylsilyl groups are preferred and the trimethoxysilyl group is particularly preferred since the groups are high in activity so as to give a good curability. From the viewpoint of storage stability, the dimethoxymethylsilyl group is particularly preferred. The triethoxysilyl and diethoxymethylsilyl groups are particularly preferred since an alcohol generated together with the hydrolysis reaction of the reactive silicon group is ethanol and the alcohol has a higher safety.

The introduction of the reactive silicon group may be performed by a known method. Examples thereof are as follows:

(A) An organic polymer having a functional group such as a hydroxyl group in the molecule is reacted with an organic compound having an active group reactive with the functional group and an unsaturated group to yield an organic polymer having the unsaturated group. Alternatively, copolymerization thereof with an unsaturated-group-containing epoxy compound is performed to yield an unsaturated-group-containing organic polymer. Next, a hydrosilane having a reactive silicon group is caused to act to the resultant reaction product to hydrosilanize the reaction product.

(B) An unsaturated-group-containing organic polymer yielded in the same manner as in the method (A) is reacted with a compound having a mercapto group and a reactive silicon group.

(C) An organic polymer having a functional group in the molecule, such as a hydroxyl group, an epoxy group or an isocyanate group, is reacted with a compound having a functional group reactive with the former functional group and a reactive silicon group.

Among the above-mentioned methods, preferred are the method (A) and the method (C) wherein a polymer having at its terminal a hydroxyl group is reacted with a compound having an isocyanate group and a reactive silicon group since a high conversion ratio is obtained in a relatively short reaction time. The method (A) is particularly preferred since the organic polymer obtained by the method (A), which has a reactive silicon group, gives a curable composition having a lower viscosity and a better workability than the composition including the organic polymer yielded by the method (C) and further the organic polymer yielded by the method (B) emits a strong odor based on the mercaptosilane.

Specific examples of the hydrosilane compound used in the method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoxime silanes such as bis(dimethylketoxymate)methylsilane, and bis(cyclohexylketoxymate)methylsilane. However, the hydrosilane compound is not limited thereto. Among these, halogenated silanes and alkoxysilanes are preferred, and the alkoxysilanes are most preferred since the curable composition to be yielded is mild in hydrolyzability so as to be easily handled. Among the alkoxysilanes, methyldimethoxysilane is particularly preferred since it is easily available and the curable composition containing an organic polymer obtained therefrom is high in curability, storage stability and elongation property.

The synthesis method (B) may be, for example, a method of introducing a compound having a mercapto group and a reactive silicon group into an unsaturated bond moiety of an organic polymer by a radical addition reaction in the presence of a radical initiator and/or a radical generator. However, the method (B) is not particularly limited. Specific examples of the compound having a mercapto group and a reactive silicon group include γ-mercaptopropyltrimethoxysilane, γ-mercaptopropylmethyldimethoxysilane, γ-mercaptopropyltriethoxysilane, γ-mercaptopropylmethyldiethoxysilane, and mercaptomethyltriethoxysialne. However, the compound is not limited thereto.

The synthesis method (C), wherein a polymer having at its terminal a hydroxyl group is reacted with a compound having an isocyanate group and a reactive silicon group, is, for example, a method disclosed in JP-A-3-47825. However, the method is not particularly limited. Specific examples of the compound having an isocyanate group and a reactive silicon group include γ-isocyanatepropyltrimethoxysilane, γ-isocyanatepropylmethyldimethoxysilane, γ-isocyanatepropyltriethoxysilane, and γ-isocyanatepropylmethyldiethoxysilane. However, the compound is not limited thereto.

As for the silane compound wherein three hydrolyzable groups are bonded to a single silicon atom, such as trimethoxysilane, a disproportionate reaction may proceed. When the disproportionate reaction proceeds, a considerably dangerous compound, such as dimethoxysilane, is generated. However, with the use of γ-mercaptopropyltrimethoxysilane or γ-isocyanatepropyltrimethoxysilane, such a disproportionate reaction does not proceed. Therefore, in the case of using, as the silicon-containing group, a group wherein three hydrolyzable groups are bonded to a single silicon atom, such as a trimethoxysilyl group, it is preferred to use the method (B) or (C).

The organic polymer having reactive silicon group(s) may be linear or branched, and the number-average molecular weight thereof is from about 500 to 100,000, more preferably from 1,000 to 50,000, particularly preferably from 3,000 to 30,000 in terms of polystyrene in GPC. If the number-average molecular weight is less than 500, inconveniences tend to be caused about the elongation property of the cured product. If the number-average molecular weight is more than 100,000, the polymer becomes a high viscosity so that inconveniences tend to be caused about the workability.

In order to yield a rubbery cured product having a high strength, a high elongation and a low elastic modulus, the total number of the reactive silicon group(s) contained in the organic polymer should be at least one on average and is preferably from 1.1 to 5 on average per molecule of the polymer. If the number of the reactive silicon group(s) contained in the molecule is less than 1 on average, the curability is insufficient so that a good rubbery elastic behavior is not easily expressed. The reactive silicon group(s) may be present at one or more terminals of the main chain of the organic polymer molecular chain or at one or more terminals of one or more side chains thereof. The reactive silicon groups may be present in both of them. In particular, when the reactive silicon group(s) is/are present only at the terminal (s) of the main chain of the molecular chain, the effective network length of the organic polymer component contained in the finally-formed cured product becomes long; therefore, a rubbery cured product exhibiting a high strength, a long elongation and a low elastic modulus is easily obtained.

The above-mentioned polyoxyalkylene polymer is a polymer essentially having repeating units each represented by the following general formula (4):

$$-R^4-O-\qquad(4)$$

wherein $R^4$ is a linear or branched alkylene group having 1 to 14 carbon atoms. $R^4$ in the general formula (4) is preferably a linear or branched alkylene group having 1 to 14 carbon atoms, preferably 2 to 4 carbon atoms. Specific examples of the repeating unit represented by the general formula (4) include:

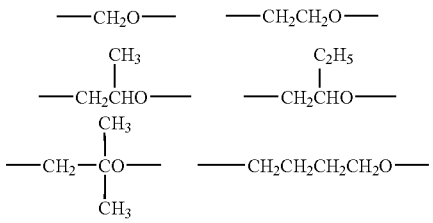

The main chain skeleton of the polyoxyalkylene polymer may be made of one kind of repeating unit, or may be made of two or more kinds of repeating units. In the case of using the composition particularly for a sealant or the like, a substance containing a polymer mainly made of a propylene oxide polymer is preferred since it is amorphous and is relatively low in viscosity.

Examples of the method for synthesizing the polyoxyalkylene polymer include a polymerization method by use of an alkali catalyst such as KOH, a polymerization method by use of a transition metal compound-porphyrin complex catalyst such as a complex obtained by the reaction of an organic aluminum compound with porphyrin, described in JP-A-61-215623, a polymerization method by use of a composite metal cyanide complex catalyst, described in JP-B-46-27250, JP-B-59-15336, and U.S. Pat. Nos. 3,278,457, 3,278,458, 3,278,459, 3,427,256, 3,427,334 and 3,427,335, and others, a polymerization method by use of a catalyst made of a polyphosphazene salt, exemplified in JP-A-10-273512, and a polymerization method by use of a catalyst made of a phosphazene compound, exemplified in JP-A-11-060722. However, the method is not particularly limited.

Examples of the method for producing the polyoxyalkylene polymer having reactive silicon group(s) include those suggested in JP-B-45-36319, JP-B-46-12154, JP-A-50-156599, JP-A-54-6096, JP-A-55-13767, JP-A-55-13468, JP-A-57-164123, JP-B-3-2450, U.S. Pat. Nos. 3,632,557, 4,345,053, 4,366,307 and 4960844, and others; and polyoxyalkylene polymers having a number-average molecular weight of 6,000 or more and a ratio of Mw/Mn of 1.6 or less, which have a high molecular weight and a narrow molecular weight distribution, the polymers being suggested in JP-A-61-197631, JP-A-61-215622, JP-A-61-215623, JP-A-61-218632, JP-A-3-72527, JP-A-3-47825, and JP-A-8-231707. However, the method is not particularly limited thereto.

As for the above-mentioned polyoxyalkylene polymer, which has a reactive silicon group, one species thereof may be used or two or more species thereof may be used together.

The above-mentioned saturated hydrocarbon polymer is a polymer which does not substantially contain any carbon-carbon unsaturated bonds other than aromatic rings. The polymer which constitutes the skeleton thereof can be obtained by a method (1) of polymerizing an olefin compound having 1 to 6 carbon atoms, such as ethylene, propylene, 1-butene or isobutylene, as a main monomer, a method (2) of homo-polymerizing a diene compound such as butadiene or isoprene, or copolymerizing a diene compound with the above-mentioned olefin compound, and then hydrogenating the resultant polymer, or some other method. Isobutylene polymers and hydrogenated polybutadiene polymers are preferred since one or more functional groups are easily introduced into a terminal of each of the polymers, the molecular weight thereof is easily controlled and the number of the terminal functional groups can be made large. The isobutylene polymers are particularly preferred.

A substance having a main chain skeleton made of the saturated hydrocarbon polymer is characterized by being excellent in heat resistance, weather resistance, durability, and moisture blocking property.

The isobutylene polymers may each be made of monomer units which are each an isobutylene unit, or may each be a copolymer made from the units and one or more different monomers. From the viewpoint of rubbery property, the isobutylene polymers are each preferably a polymer containing 50% or more by weight of repeating units each derived from isobutylene, more preferably 80% or more by weight thereof, particularly preferably 90 to 99% by weight thereof.

As the method for synthesizing the saturated hydrocarbon polymer, various polymerization methods have been reported hitherto. In particular, in recent years, many of the so-called living polymerizations have been developed. A saturated hydrocarbon polymer, in particular an isobutylene polymer can easily be produced by use of inifer polymerization found out by Kennedy et al. (J. P. Kennedy et al., J. Polymer Sci., Polymer Chem. Ed. 1997, vol. 15, 2843). It is known that polymers having a molecular weight of about 500 to 100,000 and a molecular weight distribution of 1.5 or less can be produced and various functional groups can be introduced into the molecular terminal thereof.

The process for producing the saturated hydrocarbon polymer having reactive silicon group(s) are described in, for example, specifications of JP-B-4-69659, JP-B-7-108928, JP-A-63-254149, JP-A-64-22904, JP-A-1-197509, Japanese Patent Nos. 2539445 and 2873395, and JP-A-7-53882. However, the process is not particularly limited thereto.

As for the saturated hydrocarbon polymer having reactive silicon group(s), a single species thereof may be used, or two or more species thereof may be used together.

The (meth)acrylate monomer which constitutes the main chain of the above-mentioned (meth)acrylate polymer is not particularly limited, and may be selected for use from various monomers. Examples thereof include (meth) acrylic acid, methyl (meth)acrylate, ethyl (meth)acrylate, n-propyl (meth) acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth) acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth) acrylate, stearyl (meth)acrylate, glycidyl (meth)acrylate, 2-aminoethyl (meth)acrylate, γ-(methacryloyloxypropyl)trimethoxysilane, γ-(methacryloyloxypropyl)dimethoxymethylsialne, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, trifluoromethylperfluoroethylmethyl (meth)acrylate, 2-perfluorohexylethyl (meth)acrylate, 2-perfluorodecylethyl (meth)acrylate, 2-perfluorohexadecylethyl (meth)acrylate, and other (meth) acrylic acid monomers. For the (meth)acrylate polymer, the following vinyl monomer can be copolymerized with the (meth)acrylate monomer: examples of the vinyl monomer include styrene based monomers such as styrene, vinyltoluene, α-methylstyrene, chlorstyrene, and styrenesulfonic acid and salts thereof; fluorine-containing vinyl monomers such as perfluoroethylene, perfluoropropylene, and vinylidene fluoride; silicon-containing vinyl monomers such as vinyltrimethoxysilane, and vinyltriethoxysilane; maleic anhydride, maleic acid, and monoalkyl esters and dialkyl esters of maleic acid; fumaric acid, and monoalkyl esters and dialkyl esters of fumaric acid; maleimide based monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-group-containing vinyl monomers such as acrylonitrile, and methacrylonitrile; amide-group-containing vinyl monomers such as acrylamide, and methacrylamide; vinyl esters such as vinyl acetate, vinyl propionate, vinyl pivalate, vinyl benzoate, and vinyl cinnamate; alkenes such as ethylene, and propylene; conjugated dienes such as butadiene, and isoprene; and vinyl chloride, vinylidene chloride, allyl chloride, and allyl alcohol. These may be used alone, or plural ones thereof may be copolymerized with each other. In particular, a polymer made from a styrene based monomer and a (meth)acrylic acid based monomer is preferred from the viewpoint of physical properties of the product, and others. More preferred is a (meth)acrylic based polymer made from an acrylate monomer and a methacrylate monomer, and particularly preferred is an acrylic polymer made from an acrylate monomer. A butyl acrylate based monomer is more preferred in articles for ordinary buildings and others since the composition is required to have a low viscosity and the cured product is required to have a low modulus, a high elongation, weather resistance, heat resistance and other physical properties. A copolymer mainly made of ethyl acrylate is more preferred in articles required to have oil resistance and others, such as articles for automobiles. This polymer, which is mainly made of ethyl acrylate, tends to be excellent in oil resistance but slightly poor in low temperature property (cold resistance); thus, in order to improve the low temperature property, it is possible to substitute a part of ethyl acrylate with butyl acrylate. However, as the ratio of butyl acrylate increases, the good oil resistance deteriorates. Accordingly, in articles required to have oil resistance, the ratio of butyl acrylate is set preferably to 40% or less, more preferably to 30% or less. In order to improve the low temperature property without damaging the oil resistance, it is also preferred to use 2-methoxyethyl acrylate, 2-ethoxyethyl acrylate, or the like, wherein oxygen is introduced into an alkyl group of a side chain. However, the introduction of the alkoxy group, which has an ether bond, into the side chain tends to lead poor heat resistance; therefore, when heat resistance is required, the ratio thereof is preferably set to 40% or less. Considering required physical properties such as oil resistance, heat resistance and low temperature property, an appropriate polymer can be obtained by varying the ratio in accordance with usage or required purposes. An unrestricted example wherein physical properties such as oil resistance, heat resistance and low temperature property are satisfactorily balanced is a copolymer of ethyl acrylate/butyl acrylate/2-methoxyethyl acrylate (ratio by weight: 40-50/20-30/30-20). In the present invention, these preferred monomers may be copolymerized with a different monomer, and may be block-copolymerized therewith. At this time, the ratio by weight of these preferred monomers is preferably 40% or more. In the above-mentioned expression format, for example, (meth)acrylic acid represents acrylic acid and/or methacrylic acid.

The method for synthesizing the (meth)acrylate polymer is not particularly limited, and may be a known method. However, polymers obtained by an ordinary free-radical polymerization method using an azo compound, a peroxide or the like as a polymerization initiator have a problem that the value of the molecular weight distribution is generally as large as 2 or more and the viscosity becomes high. It is therefore preferred to use a living radical polymerization method in order to yield a (meth)acrylate polymer which has a narrow molecular weight distribution and a low viscosity and which has, at a terminal of the molecular chain thereof, a crosslinkable functional group at a high ratio.

Among the "living radical polymerization methods", an "atom transfer radical polymerization method", wherein a (meth)acrylate monomer is polymerized using an organic halide or halogenated sulfonyl compound as an initiator and using a transition metal complex as a catalyst, is more preferred as a method for producing a (meth)acrylate polymer having a specific functional group. In this method, features of the "living radical polymerization method" are given and further a halogen or the like, which is relatively advantageous for a functional-group-converting reaction, is present at a terminal so that the flexibility for designing the initiator or the catalyst is large. This atom transfer radical polymerization method is described in, for example, Matyjaszewski et al., Journal of American Chemical Society (J. Am. Chem. Soc.) 1995, vol. 117, 5614.

As the method for producing the (meth)acrylate polymer having reactive silicon group(s), a production method using a free radical polymerization method using a chain transfer agent is disclosed in, for example, JP-B-3-14068, JP-B-4-55444, and JP-A-6-211922. Moreover, JP-A-9-272714 and others disclose a production method using an atom transfer radical polymerization method. However, the method is not particularly limited thereto.

As for the (meth)acrylate polymer having reactive silicon group(s), a single species thereof may be used, or two or more species thereof may be used together.

The above-mentioned organic polymers each having reactive silicon group(s) may be used alone or in combination of two or more thereof. Specifically, it is allowable to use an organic polymer obtained by blending two or more selected from the group consisting of polyoxyalkylene polymer having reactive silicon group(s), saturated hydrocarbon polymer having reactive silicon group(s), and (meth)acrylate polymer having reactive silicon group(s).

The method for producing an organic polymer obtained by blending polyoxyalkylene polymer having reactive silicon group(s) with (meth)acrylate polymer having reactive silicon group(s) is suggested in JP-A-59-122541, JP-A-63-112642, JP-A-6-172631, JP-A-11-116763, and others, but is not particularly limited thereto. A preferred specific example thereof is a method of blending a polyoxyalkylene polymer having reactive silicon group(s) with a copolymer which has reactive silicon group(s) and has a molecular chain made substantially of: (meth)acrylate monomer units each having an alkyl group having 1 to 8 carbon atoms and each represented by the following general formula (5):

—CH$_2$—C(CR$^5$)(COOR$^6$)— (5)

wherein R$^5$ represents a hydrogen atom or a methyl group, and R$^6$ represents the alkyl group, which has 1 to 8 carbon atoms; and (meth)acrylate monomer units each having an alkyl group having 10 or more carbon atoms and each represented by the following general formula (6):

—CH$_2$—C(CR$^5$)(COOR$^7$)— (6)

wherein R$^5$ has the same meaning as described above, and R$^7$ represents the alkyl group, which has 10 or more carbon atoms.

R$^6$ in the general formula (5) is an alkyl group having 1 to 8 carbon atoms, preferably 1 to 4 carbon atoms, more preferably 1 or 2 carbon atoms, such as methyl, ethyl, propyl, n-butyl, t-butyl, and 2-ethylhexyl groups. For alkyl groups of R$^6$s, a single alkyl group species may be used or two or more alkyl group species may be used.

R$^7$ in the general formula (6) is a long-chain alkyl group having 10 or more, usually 10 to 30 carbon atoms, preferably 10 to 20 carbon atoms, such as lauryl, tridecyl, cetyl, stearyl, and behenyl groups. For alkyl groups of R$^7$s, a single alkyl group species may be used or two or more alkyl group species may be used in the same manner as in the case of R$^6$s.

The molecular chain of the (meth)acrylate copolymer is substantially made of the monomers units of the formula (5) and the formula (6). The word "substantially" herein means that the total amount of the monomers units of the formula (5) and the formula (6) present in the copolymer is more than 50% by weight. The total amount of the monomers units of the formula (5) and the formula (6) is preferably 70% or more by weight.

The abundance ratio (presence ratio) by weight of the monomer units of the formula (5) to the monomer units of the formula (6) is preferably from 95/5 to 40/60, more preferably from 90/10 to 60/40.

Examples of a monomer unit which may be contained in the copolymer and is different from the monomer units of the formula (5) and the formula (6) include acrylic acids such as acrylic acid and methacrylic acid; amide groups such as acrylamide, methacrylamide, N-methylolacrylamide, and N-methylolmethacrylamide; epoxy groups such as glycidyl acrylate, and glycidyl methacrylate; amino-group-containing monomers such as diethylaminoethyl acrylate, diethylaminoethyl methacrylate, and aminoethyl vinyl ether; and others monomer units each originating from acrylonitrile, styrene, α-methylstyrene, alkyl vinyl ether, vinyl chloride, vinyl acetate, vinyl propionate, ethylene, or the like.

The organic polymer obtained by blending saturated hydrocarbon polymer having reactive silicon group(s) with (meth)acrylate copolymer having reactive silicon group(s) is suggested in JP-A-1-168764, JP-A-2000-186176, and others, but is not particularly limited thereto.

A different usable example of the method for producing the organic polymer obtained by blending (meth)acrylate copolymer having reactive silicon group(s) is a method of polymerizing a (meth)acrylate monomer in the presence of an organic polymer having reactive silicon group(s). This production method is specifically disclosed in JP-A-59-78223, JP-A-59-168014, JP-A-60-228516, JP-A-60-228517, and other publications, but is not particularly limited thereto.

The main chain skeleton of the organic polymer may contain therein other components such as a urethane bond component as long as the advantageous effects of the invention are not largely damaged.

The urethane bond component is not particularly limited, and may be a group generated by a reaction of an isocyanate group with an active hydrogen group (hereinafter, the group being referred to as an amide segment as the case may be).

The amide segment is a group represented by the following general formula (7):

—NR$^8$—C(=O)— (7)

wherein R$^8$ represents a hydrogen atom, or a substituted or unsubstituted organic group.

Specific examples of the amide segment include a urethane group, which is generated by a reaction of an isocyanate group with a hydroxyl group; a urea group, which is generated by a reaction of an isocyanate group with an amino group; and a thiourethane group, which is generated by a reaction of an isocyanate group with a mercapto group. In the present invention, examples of the group of the general formula (7) also include groups each generated by causing an active hydrogen in the urethane group, the urea group and the thiourethane group, to react further with an isocyanate group.

An example of the method for producing an organic polymer having an amide segment and reactive silicon group(s) industrially with ease is a product produced by a method of causing an excessive amount of a polyisocyanate compound with an organic polymer having at its terminals active-hydrogen-containing groups to prepare a polymer wherein a polyurethane based main chain has at its terminals isocyanate groups, and subsequently or simultaneously causing a part or the whole of individuals of the isocyanate group to react with a W group of a silicon compound represented by the following general formula (8):

W—R$^9$—SiR$^2_{3-c}$X$_c$ (8)

wherein R$^2$, X and c have the same meanings as described above, R$^9$ is a bivalent organic group, more preferably a substituted or unsubstituted bivalent hydrocarbon group having 1 to 20 carbon atoms, and W is an active-hydrogen-containing group selected from a hydroxyl group, a carboxyl group, a mercapto group, and a (mono-substituted or unsubstituted) amino group. Examples of a known organic-polymer-producing method related to this production method include JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), JP-A-2003-508561 (U.S. Pat. No. 6,197,912), JP-A-6-211879 (U.S. Pat. No. 5,364,955), JP-A-10-53637 (U.S. Pat. No. 5,756,751), JP-A-11-100427, JP-A-2000-169544, JP-A-2000-169545, JP-A-2002-212415, Japanese Patent No. 3313360, U.S. Pat. Nos. 4,067,844 and 3,711,445, and JP-A-2001-323040.

Moreover, given is a product produced by causing an organic polymer having at its terminals active-hydrogen-containing groups to react with a reactive-silicon-group-containing isocyanate compound represented by the following general formula (9):

O=C=N—R$^9$—SiR$^2_{3-c}$X$_c$ (9)

wherein R$^2$, R$^9$, X and c have the same meanings as described above. Examples of a known organic-polymer-producing method related to this production method include JP-A-11-279249 (U.S. Pat. No. 5,990,257), JP-A-2000-

119365 (U.S. Pat. No. 6,046,270), JP-A-58-29818 (U.S. Pat. No. 4,345,053), JP-A-3-47825 (U.S. Pat. No. 5,068,304), JP-A-11-60724, JP-A-2002-155145, JP-A-2002-249538, WO03/018658, and WO03/059981.

Examples of the organic polymer having at its terminals active-hydrogen-containing groups include an oxyalkylene polymer having at its terminals hydroxyl groups (polyetherpolyol), polyacrylpolyol, polyesterpolyol, saturated hydrocarbon polymer having at its terminals hydroxyl groups (polyolefinpolyol), polythiol compounds, and polyamine compounds. Among these, polyetherpolyol, polyacrylpolyol, and polyolefinpolyol are preferred since the glass transition temperature of the resultant organic polymer is relatively low and the cured product obtained therefrom is excellent in cold resistance. Especially, polyetherpolyol is particularly preferred since the obtained organic polymer is low in viscosity so as to be good in workability and the depth curability thereof is good. Polyacrylpolyol and saturated hydrocarbon polymers are more preferred since the cured product of the obtained organic polymer is good in weather resistance and heat resistance.

As the polyetherpolyol, one that is produced by any method can be used. Preferred is polyetherpolyol having at its terminal a hydroxyl group, the number of which is 0.7 per molecular terminal on the average of all molecules. Specific examples thereof include an oxyalkylene polymer produced by use of a conventional alkali metal catalyst; and an oxyalkylene polymer produced by causing alkylene oxide to react with an initiator such as a polyhydroxy compound, which has at least two hydroxyl groups, in the presence of a composite metal cyanide complex or cesium.

Among the above-mentioned polymerization methods, the polymerization method using a composite metal cyanide complex is preferred since it is possible to yield an oxyalkylene polymer having a lower unsaturation degree, a narrow Mw/Mn, a lower viscosity, a high acid resistance and a high weather resistance.

The above-mentioned polyacrylpolyol may be a polyol having a skeleton made of an alkyl (meth)acrylate (co)polymer and having a hydroxyl group in the molecule. The method for synthesizing this polymer is preferably a living radical polymerization method since a narrow molecular weight distribution and a high viscosity can be attained. An atomic transfer radical polymerization method is more preferred. It is also preferred to use a polymer based on the so-called SGO process, which is a polymer obtained by subjecting an alkyl acrylate monomer to continuous bulk polymerization at high temperature and high pressure. The polymer is described in JP-A-2001-207157. A specific example thereof is an ARUFON UH-2000 manufactured by Toagosei Co., Ltd.

Specific examples of the above-mentioned polyisocyanate compound include aromatic polyisocyanates such as toluene (tolylene)diisocyanate, diphenylmethanediisocyanate, and xylylenediisocyanate; and aliphatic polyisocyantes such as isophoronediisocyanate, and hexamethylenediisocyanate.

The silicon compound of the general formula (8) is not particularly limited, and specific examples thereof include amino-group-containing silanes such as γ-aminopropyltrimethoxysilane, N-(β-aminoethyl)-γ-aminopropyltrimethoxysilane, γ-(N-phenyl)aminopropyltrimethoxysialne, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxyl-group-containing silanes such as γ-hydroxypropyltrimethoxysilane; and mercapto-group-containing silanes such as γ-mercaptopropyltrimethoxysilane. As the silicon compound of the general formula (8), there can be used a Michael addition reaction product made from one out of various α,β-unsaturated carbonyl compounds and a primary-amino-group-containing silane, or a Michael addition reaction product made from one out of various (meth)acryloyl compounds and a primary-amino-group-containing compound, as described in JP-A-6-211879 (U.S. Pat. No. 5,364,955), JP-A-10-53637 (U.S. Pat. No. 5,756,751), JP-A-10-204144 (EP0831108), JP-A-2000-169544, and JP-A-2000-169545.

The reactive-silicon-group-containing isocyanate compound of the general formula (9) is not particularly limited, and specific examples thereof include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, and dimethoxymethylsilylmethylisocyanate. As described in JP-A-2000-119365 (U.S. Pat. No. 6,046,270), a compound obtained by a reaction of the silicon compound of the general formula (8) with an excessive amount of the above-mentioned polyisocyanate compound can also be used as the reactive-silicon-group-containing isocyanate compound of the general formula (9).

When the main chain skeleton of the organic polymer which is the component (A) in the present invention contains a large amount of the amide segments, the viscosity of the organic polymer is high so that a composition poor in workability may be obtained. On the other hand, by the use of the amide segments in the main chain skeleton of the component (A), the curability of the composition of the invention tends to be improved. Accordingly, in the case of using, as the component (A), an organic polymer having in the main chain skeleton thereof amide segments, the composition wherein the component is combined with the component (B) favorably has a speedier curability in spite of using a catalyst free from any organotin compound. When the main chain skeleton of the component (A) contains amide segments, the number of the amide segments is preferably from 1 to 10, more preferably from 1.5 to 7, particularly preferably from 2 to 5 on average per molecule. If the number is less than 1, the curability may not be sufficient. If the number is more than 10, the viscosity of the organic polymer is high so that a composition poor in workability may be obtained.

In the present invention, a carboxylic acid (b1) and/or a carboxylic acid metal salt (b2) is/are used as the component (B). The component (B) functions as the so-called silanol condensing catalyst, which is capable of forming a siloxane bond from the hydroxyl or hydrolyzable group bonded to the silicon atom contained in the organic polymer which is the component (A).

The carboxylic acid (b1) and the carboxylic acid metal salt (b2) may be used alone or may be used in combination. Each of the two is preferred since it functions as a catalyst free from any organotin compound to give only a small load to the environment.

The carboxylic acid (b1) includes, in the category thereof, carboxylic acid derivatives, from each of which a carboxylic acid is generated by hydrolysis, such as carboxylic anhydrides, esters, amides, nitriles, and acyl chlorides. The carboxylic acid (b1) is particularly preferably any carboxylic acid since it has a high catalytic activity.

Specific examples of the carboxylic acid (b1) include linear saturated aliphatic acids such as acetic acid, propionic acid, butyric acid, valeric acid, caproic acid, enanthic acid, caprylic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanoic acid, melissic acid, and lacceric acid; monoene unsaturated aliphatic acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, and 10-undecenoic acid; polyene unsaturated aliphatic acids such as linoelaidic acid, linoleic acid, 10,12-octadecadienoic acid, hiragonic acid, α-eleostearic acid, β-eleostearic acid, punicic acid, linolenic acid, 8,11,14-eicosatrienoic acid, 7,10,13-docasatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, herring acid, and docasahexaenoic acid; branched aliphatic acids such as 2-methylbutyric acid, isobutyric acid, 2-ethylbutyric acid, 2-ethylhexanoic acid, isovaleric acid, tuberculostearic acid, pivalic acid, neodecanoic acid, and 2-phenylbutyric acid; triple-bond-containing aliphatic acids such as propiolic acid, tariric acid, stearolic acid, crepenynic acid, xymenynic acid, and 7-hexadecynoic acid; alicyclic carboxylic acids such as naphthenoic acid, malvalic acid, sterculic acid, hydronocarpic acid, chaulmoogric acid, and gorlic acid; oxygen-containing aliphatic acids such as acetoacetic acid, ethoxyacetic acid, glyoxylic acid, glucolic acid, gluconic acid, sabinic acid, 2-hydroxytetradecanoic acid, ipurolic acid, 2-hydroxyhexadecanoic acid, jalapinolic acid, juniperic acid, ambrettolic acid, alueritic acid, 2-hydroxyoctadecanoic acid, 12-hydroxyoctadecanoic acid, 18-hydroxyoctadecanoic acid, 9,10-dihydroxyoctadecanoic acid, ricinoleic acid, kamlolenic acid, licanic acid, ferronic acid, and cerebronic acid; and halogen-substituted monocarboxylic acids such as chloroacetic acid, 2-chloroarylic acid, and chlorobenzoic acid. Examples of an aliphatic dicarboxylic acid include saturated dicarboxylic acids such as adipic acid, azelaic acid, pimelic acid, suberic acid, sebacic acid, ethylmalonic acid, glutaric acid, oxalic acid, malonic acid, succinic acid, and oxydiacetic acid; and unsaturated dicarboxylic acids such as maleic acid, fumaric acid, acetylene dicarboxylic acid, and itaconic acid. Examples of an aliphatic polycarboxylic acid include tricarboxylic acids such as aconitic acid, citric acid, and isocitric acid. Examples of an aromatic carboxylic acid include aromatic monocarboxylic acid such as benzoic acid, 9-anthracenecarboxylic acid, atrolactinic acid, anisic acid, isopropylbenzoic acid, salicylic acid, and toluic acid; and aromatic polycarboxylic acids such as phthalic acid, isophthalic acid, terephthalic acid, carboxyphenylacetic acid, and pyromellitic acid. Other examples thereof include amino acids, such as alanine, leucine, threonine, asparagic acid, glutamic acid, alginine, cysteine, methionine, phenylalanine, triptophan, and histidine.

The carboxylic acid (b1) is particularly preferably 2-ethylhexanoic acid, octylic acid, neodecanoic acid, oleic acid or naphthenic acid since the acid is easily available, inexpensive, and good in compatibility with the component (A).

When the carboxylic acid has a high melting point (a high crystallinity), the obtained curable composition tends to be poor in handleability (poor in workability). Accordingly, the melting point of the carboxylic acid (b1) is preferably 65° C. or lower, more preferably from −50 to 50° C., particularly preferably from −40 to 35° C.

When the carbon number of the carboxylic acid is large (the molecular weight is large), the acid is in the form of a solid or a liquid having a high viscosity so as to be poor in handleability (poor in workability). Conversely, when the carbon number of the carboxylic acid (b1) is small (the molecular weight is small), the acid is heated to be easily volatilized so that the catalytic ability may lower. In particular, under a (thin layer) condition that the composition is drawn out into a thin form, the carboxylic acid is largely volatilized so that the catalytic ability may largely fall. Accordingly, as for the carboxylic acid (b1), the number of its carbon atoms, which include the carbon atom in the carbonyl group, is preferably from 2 to 20, more preferably from 6 to 17, particularly preferably from 8 to 12.

The carboxylic acid (b1) is preferably a monocarboxylic acid or a dicarboxylic acid, and is more preferably a monocarboxylic acid from the viewpoint of the handleability (the workability and the viscosity) thereof.

The carboxylic acid (b1) is more preferably a carboxylic acid wherein the carbon atom adjacent to its carbonyl group is a tertiary carbon (for example, 2-ethylhexanoic acid) or a carboxylic acid wherein the carbon atom adjacent to its carbonyl group is a quaternary carbon (for example, neodecanoic acid or pivalic acid) since the curing speed thereof is high. Particularly preferred is the carboxylic acid wherein the carbon atom adjacent to its carbonyl group is quaternary carbon. The carboxylic acid, wherein the carbon atom adjacent to its carbonyl group is quaternary carbon, tends to be also better in adhesiveness than other carboxylic acids.

Examples of the carboxylic acid, wherein the carbon atom adjacent to its carbonyl group is quaternary carbon, include a linear aliphatic acid represented by the following general formula (10):

Formula 2

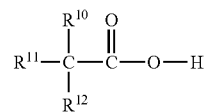

(10)

wherein $R^{10}$, $R^{11}$, and $R^{12}$ are each independently a substituted or unsubstituted monovalent hydrocarbon group, which may contain a carboxyl group; or cyclic aliphatic acids containing a structure represented by the following general formula (11):

Formula 3

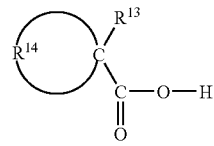

(11)

wherein $R^{13}$ is a substituted or unsubstituted monovalent hydrocarbon group, $R^{14}$ is a substituted or unsubstituted bivalent hydrocarbon group, and $R^{13}$ and $R^{14}$ may each contain a carboxyl group; and the following general formula (12):

Formula 4 (12)

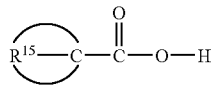

wherein $R^{15}$ is a substituted or unsubstituted trivalent hydrocarbon group, and may contain a carboxyl group. Specific examples thereof include linear monocarboxylic acids such as pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid, and 2,2-dimethyl-3-hydroxypropionic acid; linear dicarboxylic acids such as dimethylmalonic acid, ethylmethylmalonic acid, diethylmalonic acid, 2,2-dimethylsuccinic acid, 2,2-diethylsuccinic acid, and 2,2-dimethylglutaric acid; linear tricarboxylic acids such as 3-methylisocitric acid, and 4,4-dimethylaconitic acid; cyclic carboxylic acids such as 1-methylcyclopentanecarboxylic acid, 1,2,2-trimethyl-1,3-cyclopentanedicarboxylic acid, 1-methylcyclohexanecarboxylic acid, 2-methylbicyclo[2.2.1]-5-heptane-2-carboxylic acid, 2-methyl-7-oxabicyclo[2.2.1]-5-heptane-2-carboxylic acid, 1-adamantanecarboxylic acid, bicyclo[2.2.1]heptane-1-carboxylic acid, and bicyclo[2.2.2]octane-1-carboxylic acid. A large number of compounds containing such a structure are present as natural products, and these can also be used.

Among these, particularly preferred are neodecanoic acid, versatic acid, 2,2-dimethyloctanoic acid, and 2-ethyl-2,5-dimethylhexanoic acid from the viewpoint of the handleability and the availability thereof.

The carboxylic acid metal salt (b2) is preferably tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, or cerium carboxylate since the salt has a high catalytic activity. More preferred is tin carboxylate, lead carboxylate, bismuth carboxylate, titanium carboxylate, iron carboxylate, or zirconium carboxylate, and particularly preferred is tin carboxylate. Most preferred is bivalent tin carboxylate.

Examples of the carboxylic acid of the carboxylic acid metal salt (b2), which has an acid group, include the carboxylic acids exemplified as the above-mentioned carboxylic acid (b1).

When the carboxylic acid metal salt (b2) is used, a curable composition good in restorability, durability, creep resistance can be obtained. Advantageous effects can be expected also about water resistant adhesiveness, adhesiveness durability at high temperature and high humidity, residual tackiness, dust adhesive property, stain resistance, surface weather resistance, heat resistance, concrete adhesiveness, and others.

The use amount of the component (B) is preferably from 0.01 to 20 parts by weight, more preferably from 0.1 to 15 parts by weight, particularly preferably from 1 to 10 parts by weight with respect to 100 parts by weight of the component (A). If the amount of the component (B) is below this range, a practical curing speed may not be obtained and further the curing reaction does not proceed sufficiently with ease. On the other hand, if the amount of the component (B) is over this range, the period when the composition can be used is too short so that the workability or the storage stability tends to be poor.

In the present invention, an amine compound having no reactive silicon group is used as the component (C). The addition of the component (C) tends to cause an improvement in the curability.

Specific examples of the amine compound having no reactive silicon group as the component (C) include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; alipathic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine, and oleylamine; aromatic amines such as laurylaniline, stearylaniline, and triphenylamine; and other amines such as monoethanolamine, diethanolamine, triethanolamine, 3-hydroxypropylamine, diethylenetriamine, triethylenetetramine, benzylamine, 3-methoxypropylamine, 3-lauryloxypropylamine, 3-dimethylaminopropylamine, 3-diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU), and 1,5-diazabicyclo(4,3,0)nonene-5 (DBN). The amine compound is not limited thereto.

A ketimine can also be used as the component (C). Ketimine is stably present in the absence of any water, and is decomposed into a primary amine and a ketone by water. Such a ketimine can be obtained by a condensation reaction between an amine compound and a carbonyl compound.

To synthesize the ketimine, it is advisable to use a known amine compound and a known carbonyl compound. For example, the following can be used as the amine compound: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, or p,p'-biphenylenediamine; a multivalent amine such as 1,2,3-triaminopropane, triaminobenzene, tris(2-aminoethyl)amine, or tetra(aminomethyl)methane; a polyalkylenepolyamine such as diethylenetriamine, triethylenetriamine, or tetraethylenepentamine; a polyoxyalkylene based polyamine; or an aminosilane such as γ-aminopropyltriethoxysilane, N-(β-aminoethyl)-γ-aminopropyltrimethoxysilane, or N-(β-aminoethyl)-γ-aminopropylmethyldimethoxysilane. As the carbonyl compound, the following can be used: an aldehyde such as acetoaldehyde, propionaldehyde, n-butylaldehyde, isobutylaldehyde, diethylacetoaldehyde, glyoxal, or benzaldehyde; a cyclic ketone such as cyclopentanone, trimethylcyclopentanone, cyclohexanone, or trimethylcyclohexanone; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, or diisobutyl ketone; a β-dicarbonyl compound such as acetylacetone, methyl acetoacetate, ethyl acetoacetate, dimethyl malonate, diethyl malonate, methylethyl malonate, or dibenzoylmethane; or the like.

When an imino group is present in the ketimine, the imino group may be reacted with styrene oxide, a glycidyl ether such as butyl glycidyl ether or allyl glycidyl ether, a glycidyl ester, or the like. The above-mentioned ketimines may be used alone or may be used in combination of two or more thereof. The ketimines may each be used together with the above-mentioned amine compound.

These components (C) have largely different co-catalytic abilities in accordance with the structure of the components (C) themselves, the compatibility with the component (A), and others. Thus, it is preferred to select an appropriate compound in accordance with the kind of the used component (A). In the case of using, as the component (A), for example, a polyoxyalkylene polymer, preferred is a primary amine such as octylamine or laurylamine since the co-catalytic ability thereof is high. Preferred is also an amine compound having a hydrocarbon group having at least one heteroatom. The heteroatom referred to herein may be N, O, S or the like, but is not limited thereto. Examples of such an amine compound include the compounds exemplified as the above-mentioned other amines. Among the examples, more preferred is an amine compound having a hydrocarbon group having a heteroatom on the carbon atom at the 2- or 4-position thereof. Examples of such an amine compound include etylenediamine, ethanolamine, dimethylaminoethylamine, diethylaminoethylamine, 3-hydroxypropylamine, diethylenetriamine, 3-methoxypropylamine, 3-lauryloxypropylamine, N-methyl-1,3-propanediamine, 3-dimethylaminopropylamine, 3-diethylaminopropylamine, 3-(1-piperazinyl)propylamine, and 3-morpholinopropylamine. Among these, 3-diethylaminopropylamine, and 3-morpholinopropylamine are more preferred since the co-catalytic ability thereof is high. 3-Diethylaminopropylamine is particularly preferred since the amine tends to give a curable composition good in adhesiveness, workability, and storage stability. In the case of using an isobutylene based polymer as the component (A), preferred is a relatively long chain aliphatic secondary amine, such as dioctylamine or distearylamine, or an aliphatic secondary amine, such as dicyclohexylamine, since the amine is high in co-catalytic ability.

The amount of the amine compound which is the component (C) is preferably from about 0.01 to 20 parts by weight, more preferably from 0.1 to 5 parts by weight with respect to 100 parts by weight of the organic polymer of the component (A). If the blend amount of the amine compound is less than 0.01 part by weight, a sufficient curing speed may not be obtained and further the curing reaction does not proceed sufficiently with ease. On the other hand, if the blend amount of the amine compound is more than 20 parts by weight, the pot life is too short so that the workability is poor and the adhesiveness to a substrate tends to lower. Moreover, the curing speed may be reversely low.

In the present invention, an amino-group-substituted silane compound can be used as the component (D).

Specific examples of the component (D) include amino-group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine; and ketimine type silanes such as N-(1,3-dimethylbutylidene)-3-(triethoxysilyl)-1-propaneamine.

Among these, preferred are γ-aminopropyltrimethoxysilane, γ-(2-aminoethyl)aminopropyltrimethoxysilane, and γ-(2-aminoethyl)aminopropylmethyldimethoxysilane in order to keep a good adhesiveness certainly.

The amount of the amino-group-substituted silane compound, which is the component (D), needs to be decided together with the amount of the component (E). It is indispensable that the total amount of the component (D) and the component (E) is 30 mmol or more with respect to 100 g of the component (A). Specifically, the amount of the component (D) at this time is preferably from about 2 to 20 parts by weight, more preferably from 3 to 10 parts by weight with respect to 100 parts by weight of the organic polymer of the component (A). If the amount of the component (D) is less than 2 parts by weight, a sufficient adhesiveness may not be obtained. If the amount of the component (D) is more than 20 parts by weight, the cured product is brittle so that a sufficient strength may not be obtained and further the curing speed may be low. Furthermore, the ratio of the molar number (d) of all amino groups of the amino-group-substituted silane compound (D) contained in the composition to the molar number (e) of all epoxy groups of the epoxy-group-substituted silane compound (E) contained in the composition (the ratio of (d)/(e)) is preferably 1 or more. If the ratio of (d)/(e) is less than 1, the curability falls remarkably after the composition is stored.

In the present invention, an epoxy-group-substituted silane compound is used as the component (E).

Specific examples of the component (E) include epoxy-group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane.

Among these, preferred are γ-glycidoxypropyltrimethoxysilane, γ-glycidoxypropyltriethoxysilane, and γ-glycidoxypropylmethyldimethoxysilane in order to keep a good adhesiveness certainly.

The amount of the epoxy-group-substituted silane compound, which is the component (E), needs to be decided together with the amount of the component (D). It is indispensable that the total amount of the component (D) and the component (E) is 30 mmol or more with respect to 100 g of the component (A). Specifically, the amount of the component (E) at this time is preferably from about 1 to 20 parts by weight, more preferably from 1 to 10 parts by weight with respect to 100 parts by weight of the organic polymer of the component (A). If the amount of the component (E) is less than 1 part by weight, a sufficient adhesiveness may not be obtained. On the other hand, if the blend amount of the component (E) is more than 20 parts by weight, the required time for the curing becomes too long. Furthermore, the ratio of the molar number (d) of all amino groups of the amino-group-substituted silane compound (D) contained in the composition to the molar number (e) of all epoxy groups of the epoxy-group-substituted silane compound (E) contained in the composition (the ratio of (d)/(e)) is preferably 1 or more.

If the ratio of (d)/(e) is less than 1, the curability falls remarkably after the composition is stored.

The reason why the curability falls after the composition is stored if the ratio (d)/(e) (the molar number (d) of all amino groups of the amino-group-substituted silane compound (D) contained in the composition to the molar number (e) of all epoxy groups of the epoxy-group-substituted silane compound (E) contained in the composition) is less than 1 would be that a reaction described below is generated. When the carboxylic acid and/or the carboxylic acid metal salt of the component (B) functions as a silanol condensing catalyst, the amine compound of the component (C) of the present invention produces an advantageous effect of raising the catalytic activity. If the molar number of all the epoxy groups of the epoxy-group-substituted silane compound (E) contained in the composition is larger than the molar number of all the amino groups of the amino-group-substituted silane compound (D), an excessive amount of the epoxy groups of the component (E) reacts with the amino groups of the component (C) while the one-component curable composition is stored. As a result, the component (C) effective for raising the activity of the component (B) decreases. For this reason, when the curable composition is used, the catalytic activity of the component (B) cannot be sufficiently raised so that the curing speed becomes low.

A silane coupling agent other than the component (D) and (E), reaction product of a silane coupling agent other than the component (D) and (E), or compound other than any silane coupling agent can be added, as an adhesion-imparting agent, to the composition of the invention. Specific examples of the silane coupling agent include isocyanate-group-containing silanes such as γ-isocyanatepropyltrimethoxysilane, γ-isocyanatepropyltriethoxysialne, γ-isocyanatepropylmethyldiethoxysilane, γ-isocyanatepropylmethyldimethoxysialne, (isocyanatemethyl)trimethoxysilane, and (isocyanatemethyl)dimethoxymethylsilane; mercapto-group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, and γ-mercaptomethyltriethoxysilane; carboxysilanes such as β-carboxyethyltriethoxysilane, β-carboxyethylphenylbis(2-methoxyethoxy)silane, and N—β-(carboxymethyl)aminoethyl-γ-aminopropyltrimethoxysilane; vinyl-unsaturated-group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris(trimethoxysilyl)isocyanurate. Condensation products wherein the above-mentioned silanes are partially condensed can also be used. Furthermore, it is allowable to use, as the silane coupling agent, an amino-modified silyl polymer, a silanized aminopolymer, an unsaturated aminosilane complex, a phenylamino long-chain alkyl silane, aminosilanzied silicone, a silanized polyester or the like, which is a derivative obtained by modifying one out of the above-mentioned compounds. The silane coupling agent used in the present invention is used usually in an amount ranging from 0.1 to 20 parts by weight with respect to 100 parts by weight of the organic polymer (A) having a reactive silicon group. It is particularly preferred to use it in an amount ranging from 0.5 to 10 parts by weight.

In the case of using the curable composition of the invention for applying to various substrates, that is, inorganic substrates each made of glass, aluminum, stainless steel, zinc, copper, mortar or the like, and organic substrates each made of vinyl chloride, an acrylic compound, polyester, polyethylene, polypropylene, polycarbonate or the like, the silane coupling agent added to the curable composition of the invention produces a remarkable adhesiveness-improving effect under a non-primer condition or a primer treated condition. In the case of using the composition under a non-primer condition, the effect of improving the adhesiveness to various substrates is particularly remarkable. Specific examples of the agent other than any silane coupling agent, which are not particularly limited, are epoxy resin, phenol resin, sulfur, alkyltitanates, and aromatic polyisocyanates. The above-mentioned adhesion-imparting agents may be used alone or in the form of a mixture of two or more thereof. The addition of these adhesion-imparting agents makes it possible to improve the adhesiveness to substrates.

In the present invention, the carboxylic acid and/or the carboxylic acid metal salt of the component (B) is/are used as a curing catalyst; a different curing catalyst can be used together to such a degree that the advantageous effects of the invention are not lowered. Specific examples thereof include titanium compounds such as tetrabutyl titanate, tetrapropyl titanate, titanium tetrakis(acetylacetonate), and bis(acetylacetonate) diisopropoxytitanium; organic aluminum compounds such as aluminum tris(acetylacetonate), aluminum tris(ethylacetoacetate), and diisopropoxyaluminum ethylacetoacetonate; and zirconium compounds such as zirconium tetrakis(acetylacetonate). The use of these curing catalysts together makes the catalytic activity of the composition high so that an advantageous effect of improving the depth curability, the thin layer curability, the adhesiveness and others can be expected.

A filler can be added to the composition of the invention. Examples of the filler include reinforcing fillers such as fume silica, precipitating silica, crystalline silica, fused silica, dolomite, silicic anhydride, hydrated silicic acid, and carbon black; ground calcium carbonate, glue calcium carbonate, magnesium carbonate, diatomaceous earth, calcined clay, clay, talc, titanium oxide, bentonite, organic bentonite, ferric oxide, aluminum fine powder, flint powder, zinc oxide, active zinc white, shirasu balloon, glass micro-balloon, organic micro-balloon made of phenol resin or vinylidene chloride resin, PVC powder, PMMA powder, and other resin powders; and fibrous fillers such as asbestos, glass fiber, and filament. When the filler is used, the use amount thereof is from 1 to 250 parts by weight, preferably from 10 to 200 parts by weight with respect to 100 of the polymer of the component (A).

When a cured product having a high strength is desired to be obtained with the use of the filler, the filler is preferably a filler selected from fume silica, precipitating silica, crystalline silica, fused silica, dolomite, silicic anhydride, hydrated silicic acid, carbon black, precipitated fine calcium carbonate, calcined clay, clay, active zinc white, and others. When the filler is used in an amount of 1 to 200 parts by weight with respect to 100 parts by weight of the polymer (A) having reactive silicon group(s), a preferred result can be obtained. In the case that a cured product having a low strength and a large rupture elongation is desired to be obtained, a preferred result can be obtained when a filler selected from titanium oxide, a calcium carbonate species such as ground calcium carbonate, magnesium carbonate, talc, ferric oxide, zinc oxide, shirasu ballon, and others is used in an amount of 5 to 200 parts by weight with respect to 100 parts by weight of the polymer (A) having reactive silicon group(s). As the value of the specific surface area of calcium carbonate is larger, the effect of improving the rupture strength, the rupture elongation and the adhesiveness of the cured product generally becomes larger. Of course, these fillers may be used alone or in the form of a mixture of two or more thereof. When calcium carbonate is used, it is desired to use precipitated fine calcium carbonate, and a calcium carbonate species having a large particle diameter, such as ground calcium carbonate, together. The particle diameter of the precipitated fine calcium carbonate is preferably 0.5 µm or less, and the surface treatment is preferably treatment with a fatty acid or a fatty acid salt. The particle diameter of the calcium carbonate species having a large particle diameter is preferably 1 µm or more. The species not subjected to any surface treatment can be used.

In order to improve the workability (such as anti-sagging) of the composition or make the surface of the cured product mat, it is preferred to add an organic balloon or inorganic balloon thereto. The filler may be subjected to surface treatment. Only one species thereof may be used, or two or more species thereof may be used in a mixture form. To improve the workability (such as anti-sagging), the particle diameter of the balloon is preferably 0.1 mm or less. To make the cured product surface mat, the diameter is preferably from 5 to 300 µm.

The composition of the invention can be preferably used for: a joint of outer walls of a building, such as siding boards, in particular, ceramic siding boards; an adhesive agent for outer wall tiles; an adhesive agent, for outer wall tiles, that may remain as it is in the joint of the walls; or the like, since the cured product therefrom has good chemical resistance and other properties. It is desired that the design of outer walls is in harmony with the design of the sealant. The composition is used for high-quality outer walls when sputtering paint is used together or colored aggregate is incorporated into the composition. When a scaly or granular substance having a diameter of about 0.1 mm or more, preferably about 0.1 to 5.0 mm is included in the composition of the invention, the cured product is in harmony with high-quality outer walls and the external appearance of the cured product is maintained over a long term since the cured product is excellent in chemical resistance. When the granular substance is used, the surface becomes a sandy surface with a scattered sand tone or a sandstone tone. When the scaly substance is used, the surface becomes an uneven surface based on the scales.

As described in JP-A-9-53063, a diameter, a blend amount, a material and other factors preferred for the scaly or granular substance are as follows:

The diameter is about 0.1 mm or more, preferably from about 0.1 to 5.0 mm. In accordance with the material or pattern of outer walls, and others, the substance which has an appropriate size can be used. The substance which has a size of about 0.2 to 5.0 mm, or about from 0.5 to 5.0 mm can also be used. In the case of the scaly substance, the thickness is made as small (about 0.01 to 1.00 mm) as about 1/10 to 1/5 of the diameter. The scaly or granular substance is beforehand incorporated into the sealing main material, and the resultant is carried as a sealant to a construction site, or the substance is incorporated into the sealing main material at a construction site when the substance is used.

The scaly or granular substance is blended in an amount of about 1 to 200 parts by weight with respect to 100 parts by weight of the composition such as the composition for a sealing or an adhesive. The amount is appropriately selected in accordance with the size of individual pieces or grains of the scaly or granular substance, the material or the pattern of outer walls, and others.

As the scaly or granular substance, there is used a natural material such as silica sand or mica, synthetic rubber, synthetic resin, or an inorganic material such as alumina. In order to make the designability thereof high when it is filled into a joint portion, the substance is colored into an appropriate color in accordance with the material or the pattern of outer walls, and others.

A preferred finishing method and so on are described in JP-A-9-53063.

When a balloon (preferably having an particle diameter of 0.1 mm or more on average) is used for a similar purpose, the cured product has a sandy surface with a scattered sand tone or a sandstone tone and further the cured product can be made light. As described in JP-A-10-251618, a diameter, an amount, a material and other factors preferred for the balloon are as follows:

The balloon is a spherical filler the inside of which is hollow. Examples of the material of this balloon include inorganic materials such as glass, shirasu, and silica, and organic materials such as phenol resin, urea resin, polystyrene, and saran. However, the material is not limited only thereto. An inorganic material and an organic material are compounded, or the materials are laminated to form a multilayer. A balloon made of an inorganic material, an organic material, or a material wherein these are compounded can be used. A single species of balloon or a mixture species wherein different balloons are mixed may be used. The balloon that can be used may be a balloon having a worked or coated surface or a balloon having a precipitated with a variety of surface treating agents. For example, an organic balloon may be coated with calcium carbonate, talc, titanium oxide, or the like, or an inorganic balloon may be precipitated with a silane coupling agent.

In order to obtain a sandy surface with a scattered sand tone or a sandstone tone, the granular diameter of the balloon is preferably 0.1 mm or more. A balloon having a granular diameter of about 0.2 to 5.0 mm or about 0.5 to 5.0 mm can also be used. If the diameter is less than 0.1 mm, only the viscosity of the composition is raised but a sandy feeling may not be exhibited even if a large amount of the balloon is blended with the other components. The amount of the balloon can easily be decided in accordance with the degree of a desired sandy feeling with a scattered sand tone or sandstone tone. Usually, it is desired to blend a balloon having a granular diameter of 0.1 mm or more at a volume concentration of 5 to 25% by volume of the composition. If the volume concentration of the balloon is less than 5% by volume, no sandy feeling is obtained. If the concentration is more than 25% by volume, the viscosity of the sealant or adhesive becomes high so that the workability deteriorates. Moreover, the modulus of the cured product also becomes high. Thus, basic performances of the sealant or adhesive tend to be damaged. For the balance between the feeling and basic performances of the sealant, a particularly preferred volume concentration is from 8 to 22% by volume.

When the balloon is used, the following can be added: a slip inhibitor as described in JP-A-2000-154368, or an amine compound for changing the surface of the cured product into an uneven state to make the surface mat, in particular, a primary amine and/or a secondary amine having a melting point of 35° C. or higher, as described in JP-A-2001-164237.

Specific examples of the balloon are described in JP-A-2-129262, 4-8788, 4-173867, 5-1225, 7-113073, 9-53063, 10-251618, 2000-154368 and 2001-164237, WO 97/05201, and other publications.

When the composition of the invention contains sealant-cured particles, it is possible as well to make irregularities in the surface and improve the designability. As described in JP-A-2001-115142, a diameter, a blend amount, a material and others preferred for the sealant-cured particles are as follows: The diameter is preferably from about 0.1 to 1 mm, more preferably from about 0.2 to 0.5 mm. The blend amount in the curable composition is preferably from 5 to 100% by weight, more preferably from 20 to 50% by weight of the composition. Examples of the material include urethane resin, silicone, modified silicone, and polysulfide rubber. The material is not limited as long as the material is a material used for sealants. A modified silicone based sealant is preferred.

Moreover, a silicate can be used in the composition of the invention. This silicate acts as a crosslinking agent, and has a function of improving the restorability, the durability and creep resistance of the component (A) in the present invention. Furthermore, the silicate also has a function of improving the adhesiveness, the water-resistant adhesiveness, and the adhesiveness durability at high temperature and high humidity. As the silicate, tetraalkoxysilane or a partially-hydrolyzed condensation product thereof can be used.

In the case of using the silicate, the use amount thereof is preferably from 0.1 to 20 parts by weight, more preferably from 0.5 to 10 parts by weight with respect to 100 parts by weight of the polymer of the component (A).

Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, and tetra-t-butoxysilane; and partially-hydrolyzed condensation products thereof.

Examples of the partially-hydrolyzed condensation products of tetraalkoxysilanes include products each obtained by adding water to a tetraalkoxysilane in a usual way, and then hydrolyzing the resultant partially so as to be condensed. As partially-hydrolyzed condensation products of organosilicate compounds, commercially available products can be used. Examples of the condensation products include Methyl Silicate 51, and Ethyl Silicate 40 (each manufactured by Colcoat Co., Ltd.).

A plasticizer can be added to the composition of the invention. The addition of the plasticizer makes it possible to adjust the viscosity and the slump property of the curable composition, and the tensile strength, the elongation and other mechanical properties of the cured product obtained by curing the composition. Examples of the plasticizer include phthalic acid esters such as dibutyl phthalate, diheptyl phthalate, bis(2-ethylhexyl) phthalate, and butylbenzyl phthalate; non-aromatic bibasic acid esters such as dioctyl adipate, dioctyl sebacate, dibutyl sebacate, and isodecyl succinate; aliphatic esters such as butyl oleate, and methyl acetylricinolate; phosphates such as tricresyl phosphate, and tributyl phosphate; trimellitic acid esters; chlorinated paraffins; hydrocarbon oils such as alkyldiphenyl, and partially-hydrogenated terphenyl; process oils; epoxy plasticizers such as epoxidized soybean oil, and benzyl epoxystearate.

A polymeric plasticizer can also be used. In the case of using the polymeric plasticizer, the initial physical properties are maintained over a longer term than the case of using a low molecular weight plasticizer, which does not contain any polymeric component in the molecule. Furthermore, when an alkyd paint is applied to the cured product, the dryability, which may be called paintability, can be improved. Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, and pentaerythritol esters; polyester plasticizers each made from a dibasic acid such as sebacic acid, adipic acid, azelaic acid or phthalic acid, and a dihydric alcohol such as ethylene glycol, diethylene glycol, triethylene glycol, propylene glycol or dipropylene glycol; polyethers, for example, polyetherpolyols such as polyethylene glycol, polypropylene glycol or polytetramethylene glycol which has a molecular weight of 500 or more, preferably 1000 or more, or derivatives obtained by changing hydroxyl groups of these polyetherpolyols to ester groups, ether groups, or the like; polystyrenes such as polystyrene, and poly-α-methylstyrene; and polybutadiene, polybutene, polyisobutylene, butadiene-acrylonitrile, and polychloroprene. However, the polymeric plasticizer is not limited thereto.

Among these polymeric plasticizers, ones compatible with the component (A) are preferred. From this viewpoint, polyethers and vinyl polymers are preferred. When a polyether is used as the plasticizer, the depth curability is improved. Moreover, after the composition is stored, the curing speed of the composition does not have retardation. Thus, the use of such polyehers or vinyl polymers is preferred. Among the plasticizers, polypropylene glycol is more preferred. From the viewpoint of compatibility, weather resistance and heat resistance, vinyl polymers are preferred. Among the vinyl polymers, acrylic polymers and/or methacrylic polymers are preferred, and acrylic polymers such as poly(alkyl acrylate) are more preferred. The method for synthesizing the polymers is preferably a living radical polymerization method since the molecular weight distribution is narrow and a low viscosity can be obtained. An atom transfer radical polymerization method is more preferred. It is also preferred to use a polymer based on the so-called SGO process, which is obtained by subjecting an alkyl acrylate monomer described in JP-A-2001-207157 to continuous bulk polymerization at high temperature and high pressure.

The number-average molecular weight of the polymeric plasticizer is preferably from 500 to 15000, more preferably from 800 to 10000, even more preferably from 1000 to 8000, particularly preferably from 1000 to 5000. The molecular weight is most preferably from 1000 to 3000. If the molecular weight is too low, the plasticizer flows out with time by heat or rainfall so that the initial physical properties cannot be maintained over a long term, and the alkyd paintability cannot be improved. If the molecular weight is too high, the viscosity becomes high so that the workability deteriorates. The molecular weight distribution of the polymeric plasticizer is not particularly limited, and a narrow distribution is preferred. The distribution is preferably less than 1.80, more preferably 1.70 or less, even more preferably 1.60 or less, even more preferably 1.50 or less, particularly preferably 1.40 or less, most preferably 1.30 or less.

In the case that the plasticizer is a vinyl polymer, the number-average molecular weight is measured by a GPC method. In the case that the plasticizer is a polyether polymer, the number-average molecular weight is measured by terminal group analysis. The molecular weight distribution (Mw/Mn) is measured by a GPC method (in terms of polystyrene).

The polymeric plasticizer may have no reactive silicon group, or may have a reactive silicon group. When the plasticizer has a reactive silicon group, the plasticizer acts as a reactive plasticizer. Thus, the plasticizer can be prevented from being shifted from the cured product. When the plasticizer has one or more reactive silicon groups, the number of the reactive silicon groups is preferably 1 or less, more preferably 0.8 or less per molecule on average. In the case of using a plasticizer having a reactive silicon group, in particular, an oxyalkylene polymer having reactive silicon group(s), the number-average molecular weight thereof is preferably lower than that of the polymer of the component (A).

About the plasticizer, only one species thereof may be used, or two or more species thereof may be used together. A low molecular weight plasticizer and a polymeric plasticizer may be used together. These plasticizers may be blended when the polymer is produced.

The amount of the used plasticizer is from 5 to 150 parts by weight, preferably from 10 to 120 parts by weight, even more preferably from 20 to 100 parts by weight with respect to 100 parts by weight of the polymer(s) of the component (A). If the amount is less than 5 parts by weight, effects as a plasticizer are not expressed. If the amount is more than 150 parts by weight, the mechanical strength of the cured product is insufficient.

If necessary, a physical property adjustor for adjusting tensile characteristics of the cured product may be added to the curable composition of the invention. The physical property adjustor is not particularly limited, and examples thereof include alkylalkoxysilanes such as methyltrimethoxysilane, dimethyldimethoxysilane, trimethylmethoxysilane, and n-propyltrimethoxysilane; alkoxysilanes having an unsaturated group, such as dimethyldiisopropenoxysilane, methyltriisopropenoxysilane, other alkylisopropenoxysilanes, vinyltrimethoxysilane, and vinyldimethylmethoxysilane; silicone vanish; and polysiloxanes. The use of the physical property adjustor makes it possible that when the composition of the invention is cured, the hardness is raised or the hardness is conversely lowered so as to produce rupture elongation. The above-mentioned physical property adjustors may be used alone or in combination of two or more thereof.

In particular, a compound which can be hydrolyzed, thereby generating a compound having a monovalent silanol group in the molecule has an effect of lowering the modulus of the cured product without deteriorating the stickiness of the surface of the cured product. A compound which can generate trimethylsilanol is particularly preferred. Examples of the compound which can be hydrolyzed, thereby generating a compound having a monovalent silanol group in the molecule include compounds described in JP-A-5-117521. Other examples thereof include compounds which are each a derivative of an alkylalcohol such as hexanol, octanol or decanol, and can each generate a silicon compound which can be hydrolyzed, thereby generating $R^3SiOH$ such as trimethylsilanol; and compounds which are each a derivative of a polyhydric alcohol having 3 or more hydroxyl groups, such as trimethylolpropane, glycerin, pentaerythritol or sorbitol, as described in JP-A-11-241029, and can each generate a silicon compound which can be hydrolyzed, thereby generating $R^3SiOH$ such as trimethylsilanol.

Different examples thereof include compounds which are each a derivative of an oxypropylene polymer, and can each generate a silicon compound which can be hydrolyzed, thereby generating $R^3SiOH$ such as trimethylsilanol, as described in JP-A-7-258534. Furthermore, there can be used a polymer having a crosslinkable, hydrolyzable silicon-containing group and a silicon-containing group which can be hydrolyzed so as to be converted to a monosilanol-containing compound, as described in JP-A-6-279693.

The physical property adjustor is used in an amount of 0.1 to 20 parts by weight, preferably 0.5 to 10 parts by weight with respect to 100 parts by weight of the polymer (A) having a reactive silicon group.

If necessary, a thixotrope (anti-sagging agent) may be added to the curable composition of the invention to prevent the composition from dripping to make the workability good. The anti-sagging agent is not particularly limited, and examples thereof include polyamide waxes; hydrogenated castor oil derivatives; and metal soaps such as calcium stearate, aluminum stearate, and barium stearate. These thixotropes (anti-sagging agents) may be used alone or in combination of two or more thereof. The thixotrope(s) is/are used in an amount of 0.1 to 20 parts by weight with respect to 100 parts by weight of the polymer (A) having a reactive silicon group.

In the composition of the invention, a plasticizer having in a single molecule thereof an epoxy group can be used as an epoxy compound other than the component (E). When the plasticizer having an epoxy group is used, the restorability of the cured product can be made high. Examples of the plasticizer having an epoxy group include epoxidized unsaturated oils and fats, epoxidized unsaturated aliphatic acid esters, alicyclic epoxy compounds, epichlorohydrin derivatives, and mixtures thereof. Specific examples thereof include epoxidized soybean oil, epoxidized linseed oil, bis(2-ethylhexyl)-4,5-epoxycyclohexane-1,2-dicarboxylate (E-PS), epoxyoctyl stearate, and epoxybutyl stearate. Among these, E-PS is particularly preferred. It is advisable to use the epoxy plasticizer in an amount of 0.5 to 50 parts by weight with respect to 100 parts by weight of the polymer (A) having reactive silicon group(s).

In the composition of the invention, a photo-curable material can be used. When the photo-curable material is used, a coating of the photo-curable material is formed on the surface of the cured product. Thus, the stickiness or the weather resistance of the cured product can be improved. The photo-curable material is a material which undergoes a chemical change in the molecular structure by action of light so as to generate a physical change such as curing. As a compound of this type, many materials are known, examples of which include organic monomers, oligomers, resins, and compositions containing these materials. Any commercially available product can be used. Typically, an unsaturated acrylic compound, a polyvinyl cinnamate, an azide resin or the like can be used. The unsaturated acrylic compound is a monomer or oligomer having one or more acrylic or methacrylic unsaturated groups, or a mixture thereof. Examples thereof include monomers such as propylene (or butylene or ethylene) glycol di(meth)acrylate, neopentyl glycol di(meth)acrylate, or oligoesters made from such a monomer and having a molecular weight of 10000 or less. Specific examples thereof include ARONIX M-210, ARONIX M-215, ARONIX M-220, ARONIX M-233, ARONIX M-240, and ARONIX M-245, which are each an especial (bifunctional) acrylate; (trifunctional) ARONIX M-305, ARONIX M-309, ARONIX M-310, ARONIX M-315, ARONIX M-320, and ARONIX M-325; and (polyfunctional)ARONIX M-400. In particular, compounds having an acrylic functional group are preferred, and compounds each containing in a single molecule thereof 3 or more acrylic functional groups on average are preferred. (The above-mentioned ARONIX are products manufactured by Toagosei Co., Ltd.)

The polyvinyl cinnamate is a photosensitive resin having a cinnamoyl group as a photosensitive group, and examples thereof include a product obtained by esterifying polyvinyl alcohol with cinnamic acid, and many polyvinyl cinnamate derivatives. The azide resin is known as a photosensitive resin having an azide group as a photosensitive group. An example thereof is a rubber photosensitive liquid wherein a diazide compound is usually added as a photosensitive agent. Besides, detailed examples thereof are described in "Photosensitive Resin" (published on Mar. 17, 1972 by Insatsu Gakkai Shuppanbu Ltd., on and after p. 93, on and after p. 106, and on and after 117). These may be used alone or in a mixture form in a state that a sensitizer is added thereto if necessary. When a sensitizer such as a ketone or a nitro compound, or an accelerator such as an amine is added thereto, advantageous effects may be improved. It is advisable to use the photo-curable material in an amount of 0.1 to 20 parts by weight, preferably 0.5 to 10 parts by weight with respect to 100 parts by weight of the polymer (A) having a reactive silicon group. If the amount is less than 0.1 part by weight, no effect of improving the weather resistance is produced. If the amount is 20 parts or more by weight, the cured product becomes too hard so that the product tends to be cracked.

An oxygen curable material can be used in the composition of the invention. Examples of the oxygen curable material include unsaturated compounds reactive with oxygen in the air. The material reacts with oxygen in the air to form a cured coating in the vicinity of the surface of the cured product, thereby fulfilling an act of preventing the stickiness of the surface or adhesion of wastes or dust onto the cured product surface. Specific examples of the oxygen curable material include drying oils, typical examples of which are tung oil and linseed oil; various alkyd resins obtained by modifying the compounds; acrylic polymer, epoxy resin, and silicone resin which are each modified with a drying oil; liquid polymers such as 1,2-polybutadiene, 1,4-polybutadiene, and C5 to C8 diene polymer, which are each obtained by polymerizing or copolymerizing one or more diene compounds such as butadiene, chloroprene, isorepene, and 1,3-pentadiene; liquid copolymers such as NBR and SBR, which are each obtained by copolymerizing a monomer copolymerizable with the diene compounds, such as acrylonitrile or styrene, with one or more of the diene compounds so as to make the diene compound(s) into one or more main components; and various modified products thereof (such as maleic acid modified products and boiled oil modified products). These may be used or in combination of two or more thereof. Among these, tung oil and liquid diene polymers are particularly preferred. When a catalyst for promoting the oxidization curing reaction or a metal drier is used together, the advantageous effects may be enhanced. Examples of the catalyst or metal drier include metal salts such as cobalt naphthenate, lead naphthenate, zirconium naphthenate, cobalt octylate and zirconium octylate; and amine compounds. The use amount of the oxygen curable material is preferably from 0.1 to 20 parts by weight, more preferably 0.5 to 10 parts by weight with respect to 100 parts by weight of the polymer (A) having a reactive silicon group. If the use amount is less than 0.1 part by weight, an improvement in pollution resistance is insufficient. If the amount is more than 20 parts by weight, the tensile characteristic or the like of the cured product tends to be damaged. As described in JP-A-3-160053, it is desired to use the oxygen curable material together with the photo-curable material.

An antioxidant (age resistor) can be used in the composition of the invention. When the antioxidant is used, the heat resistance of the cured product can be enhanced. Examples of the antioxidant include hindered phenols, monophenols, bisphenols, and polyphenols. Particularly preferred are hindered phenols. Similarly, the following can also be used: a hindered amine photostabilizer named TINUVIN 622LD, TINUVIN 144, CHIMASSORB 944LD, or CHIMASSORB 119FL (which is manufactured by Ciba Specialty Chemicals Inc.); MARK LA-57, MARK LA-62, MARK LA-67, MARK LA-63, or MARK LA-68 (which is manufactured by ADEKA CORPORATION); or SANOL LS-770, SANOL LS-765, SANOL LS-292, SANOL LS-2626, SANOL LS-1114, or SANOL LS-744 (which is manufactured by Sankyo Co., Ltd.). Specific examples of the antioxidant are described in JP-A-4-283259 and 9-194731 also. The use amount of the antioxidant is preferably from 0.1 to 10 parts by weight, more preferably from 0.2 to 5 parts by weight with respect to 100 parts by weight of the polymer (A) having reactive silicon group(s).

A photostabilizer can be used in the composition of the invention. The use of the photostabilizer makes it possible to prevent the cured product from being deteriorated by photooxidation. Examples of the photostabilizer include benztriazole compounds, hindered amine compounds, and benzoate compounds. Particularly preferred are hindered amine compounds. The use amount of the photostabilizer is preferably from 0.1 to 10 parts by weight, more preferably from 0.2 to 5 parts by weight with respect to 100 parts by weight of the polymer (A) having reactive silicon group(s). Specific examples of the photostabilizer are described in JP-A-9-194731 also.

In the case of using a photocurable material, in particular, an unsaturated acrylic compound together in the composition of the invention, it is preferred to use a tertiary-amine-containing hindered amine photostabilizer as a hindered amine photostabilizer, as described in JP-A-5-70531, in order to improve the storage stability of the composition. Examples of the tertiary-amine-containing hindered amine photostabilizer include photostabilizers named TINUVIN 622LD, TINUVIN 144, and CHIMASSORB 119FL (each manufactured by Ciba Specialty Chemicals Inc.); MARK LA-57, MARK LA-62, MARK LA-67, and MARK LA-63 (each manufactured by ADEKA CORPORATION); and SANOL LS-765, SANOL LS-292, SANOL LS-2626, SANOL LS-1114, and SANOL LS-744 (each manufactured by Sankyo Co., Ltd.).

An ultraviolet absorber can be used in the composition of the invention. The use of the ultraviolet absorber makes it possible to enhance the surface weather resistance of the cured product. Examples of the ultraviolet absorber include benzophenone compounds, benzotriazole compounds, salicylate compounds, substituted tolyl compounds, and metal chelate compounds. Particularly preferred are benzotriazole compounds. The use amount of the ultraviolet absorber is preferably from 0.1 to 10 parts by weight, more preferably from 0.2 to 5 parts by weight with respect to 100 parts by weight of the polymer (A) having reactive silicon group(s). It is preferred to use a phenolic or hindered phenolic antioxidant, a hindered amine photostabilizer, and a benzotriazole ultraviolet absorber together.

An epoxy resin can be added, as an epoxy compound other than the component (E), to the composition of the invention. The composition to which the epoxy resin is added is particularly preferred as an adhesive, in particular, as an adhesive for outer wall tiles. Examples of the epoxy resin include epichlorohydrin-bisphenol A epoxy resin, epichlorohydrin-bisphenol F epoxy resin, glycidyl ether of tetrabromobisphenol A, other flame retardant epoxy resins, novolak epoxy resin, hydrogenated bisphenol A epoxy resin, glycidyl ether type epoxy resin of a bisphenol A propylene oxide adduct, glycidyl etherester type epoxy resin of p-oxybenzoic acid, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ether, glycerin, other glycidyl ethers of polyhydric alcohol, hydantoin type epoxy resin, petroleum resin, and other epoxidized unsaturated polymers. However, the epoxy resin is not limited thereto, and any epoxy resin that is ordinarily used can be used. Preferred is an epoxy resin having at least two epoxy groups in the molecule since a high reactivity is exhibited when the resin is cured and a three-dimensional network structure is easily formed in the cured product. More preferred is bisphenol A epoxy resin or novolak epoxy resin. The ratio by weight of the used epoxy resin to the polymer (A) having reactive silicon group(s) ranges from 100/1 to 1/100. If the ratio of the (A) to the epoxy resin is less than 1/100, the impact strength of the epoxy resin cured product or the toughness-improving effect thereof is not easily obtained. If the ratio of the (A)/the epoxy resin is more than 100/1, the strength of the organic polymer cured product becomes insufficient. A preferred use ratio therebetween is not decided without reservation since the ratio is varied in accordance with the usage of the curable resin composition, or the like. In the case of improving, for example, the impact resistance, flexibility, toughness, peel strength or the like of the epoxy resin cured product, the component (A) is used preferably in an amount of 1 to 100 parts by weight, more preferably in an amount of 5 to 100 parts by weight with respect to 100 parts by weight of the epoxy resin. In the case of improving the strength of the cured product of the component (A), the epoxy resin is used preferably in an amount of 1 to 200 parts by weight, more preferably in an amount of 5 to 100 parts by weight with respect to 100 parts by weight of the component (A).

In the case of the addition of the epoxy resin, a curing agent for curing the epoxy resin can be naturally be used together in the composition of the invention. The epoxy resin curing agent which can be used is not particularly limited, and may be any epoxy resin curing agent that is ordinarily used. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyether; tertiary amines such as 2,4,6-tris(dimethylaminomethyl)phenol and tripropylamine, and salts of these tertiary amines; polyamide resins; imidazoles; dicyandiamide; trifluoroboron complex compounds; carboxylic anhydrides such as phthalic anhydride, hexahydrophthalic anhydride, tetrahydrophthalic anhydride, dodecylsuccinic anhydride, pyromellitic anhydride, and chlorendic anhydride; alcohols; phenols; carboxylic acids; and diketone complex compounds of aluminum or zirconium. However, the curing agent is not limited thereto. The above-mentioned curing agents may be used alone or in combination of two or more thereof.

When the epoxy resin curing agent is used, the use amount thereof ranges from 0.1 to 300 parts by weight with respect to 100 parts by weight of the epoxy resin.

A ketimine can be used as the epoxy resin curing agent. The ketimine is stably present in the absence of water, and is dissolved into a primary amine and a ketone by water. The resultant primary amine becomes a curing agent for epoxy resin which can be cured at room temperature. When the ketimine is used, a one-component composition can be obtained. Such a ketimine compound can be obtained by a condensation reaction between an amine compound and a carbonyl compound.

In order to synthesize the ketimine, a known amine compound and a known carbonyl compound may be used. As the amine compound, the following is used: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, or p,p'-biphenylenediamine; a polyvalent amine such as 1,2,3-triaminopropane, triaminobenzene, tris(2-aminoethyl)amine, and tetra(aminomethyl)methane; a polyalkylenepolyamine such as diethylenetriamine, triethylenetriamine, or tetraethylenepentamine; a polyoxyalkylene polyamine; an aminosilane such as γ-aminopropyltriethoxysilane, N-(β-aminoethyl)-γ-aminopropyltrimethoxysilane, or N-(β-aminoethyl)-γ-aminopropylmethyldimethoxysilane; or the like. As the carbonyl compound, the following can be used: an aldehyde such as acetoaldehyde, propionaldehyde, n-butylaldehyde, isobutylaldehyde, diethylacetoaldehyde, glyoxal, or benzaldehyde; a cyclic ketone such as cyclopentanone, trimethylcyclopentanone, cyclohexanone, or trimethylcyclohexanone; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, or diisobutyl ketone; a β-dicarbonyl compound such as acetylacetone, methyl acetoacetate, ethyl acetoacetate, dimethyl malonate, diethyl malonate, methylethyl malonate, or dibenzoylmethane; or the like.

When an imino group is present in the ketimine, the imino group may be reacted with styrene oxide, a glycidyl ether such as butyl glycidyl ether or allyl glycidyl ether, a glycidyl ester, or the like. The above-mentioned ketimines may be used alone or in combination of two or more thereof. The use amount thereof is from 1 to 100 parts by weight with respect to 100 parts by weight of the epoxy resin, and is varied in accordance with the kind of the epoxy resin and that of the ketimine.

A solvent can be used in the composition of the invention to decrease the viscosity of the composition, make the thixotropy high, and improve the workability. The solvent is not particularly limited, and various compounds can be used. Specific examples thereof include hydrocarbon solvents such as toluene, xylene, heptane, hexane, and petroleum based solvents, halogen-containing solvents such as trichloroethylene, ester solvents such as ethyl acetate and butyl acetate, ketone solvents such as acetone, methyl ethyl ketone, and methyl isobutyl ketone, alcohols such as methanol, ethanol, and isopropanol, and silicon solvents such as hexamethylcyclotrisiloxane, octamethylcyclotetrasiloxane, and decamethylcyclopentasiloxane. These solvents may be used alone or in combination of two or more thereof.

However, in the case that the amount of the solvent is large, toxicity to the human body may become high and further a shrinkage in the volume of the cured product or the like may be observed. Accordingly, the amount of the solvent is preferably 3 parts or less by weight, more preferably 1 part by weight with respect to 100 parts by weight of the organic polymer of the component (A). Most preferably, the composition does not substantially contain any solvent.

If necessary, various additives may be added to the curable composition of the invention in order to adjust various physical properties of the curable composition or the cured product. Examples of the additives include a flame retardant, a curability adjustor, a radical inhibitor, a metal inactivating agent, an ozone deterioration preventive, a phosphorus-containing peroxide decomposer, a lubricant, a pigment, a foaming agent, and an antifungal agent. These additives may be used alone or in combination of two or more thereof. Specific examples of additives other than the specific examples of the additives described in the specification are described in JP-B-4-69659 and 7-108928, and JP-A-63-254149, 64-22904 and 2001-72854, and others.

The curable composition of the invention can be prepared into a one component form, wherein all components are beforehand blended, air-tightly sealed up and stored, and after the resultant blend is actually used, the composition is cured with moisture in the air. Alternatively, the composition can be prepared into a two-component form, wherein a curing catalyst, a filler, a plasticizer, water and other components are separately blended with each other as a curing agent, and this blend and a polymer composition are mixed before used. From the viewpoint of workability, the one-liquid form is preferred.

In the case that the curable composition is in a one component form, all of the components are beforehand blended with each other; therefore, it is preferred to use the components which contain water after the components are dehydrated and dried in advance, or dehydrate the composition by pressure-reduction when the components are blended and kneaded. In the case that the curable composition is in a two-component form, it is unnecessary to blend a curing catalyst with the main agent containing the polymer having reactive silicon group(s); therefore, it is hardly feared that the blend components are gelatinized even if the components contain a certain amount of water. However, in the case that the composition is required to have storage stability for a long term, the composition is preferably dehydrated and dried. Preferred examples of the method for the dehydration and drying include a heating drying method when the composition is in the form of a solid such as powder; and a pressure-reducing dehydrating method or a dehydrating method using synthetic zeolite, activated alumina, or silica gel or the like when the composition is in a liquid form. It is allowable to incorporate a small amount of an isocyanate compound into the composition to cause the isocyanate group to react with water, thereby attaining dehydration. By the addition of the following compound besides this dehydration drying method, the storage stability is made better: a lower alcohol such as methanol or ethanol; or an alkoxysilane compound such as n-propyltrimethoxysilane, vinyltrimethoxysialne, vinylmethyldimethoxysilane, γ-mercaptopropylmethyldimethoxysilane, γ-mercaptopropylmethyldiethoxysilane, or γ-glycycloxypropyltrimethoxysilane.

The use amount of the dehydrating agent, in particular, a silicon compound reactive with water, such as vinyltrimethoxysilane, is preferably from 0.1 to 20 parts by weight, more preferably from 0.5 to 10 parts by weight with respect to 100 parts by weight of the polymer (A) having reactive silicon group(s).

The method for preparing the curable composition of the invention is not particularly limited, and a usual method is adopted, an example of the method being a method of blending the above-mentioned components with each other, and then using a mixer, a roll, a kneader or the like to knead the blend at normal temperature or while the blend is heated, or a method of using a small amount of an appropriate solvent to dissolve the above-mentioned components therein, and then mixing the components.

When the curable composition of the invention is exposed to the atmosphere, the composition forms a three-dimensional network structure by action of water, so as to be cured into a solid having rubbery elasticity.

The curable composition of the invention can be used for a binder, a sealing agent for a building, ship, car or road, an adhesive, a mold or pattern-forming material, a vibration isolating material, a vibration reducing material, a soundproof material, a foaming material, a paint, a spraying material, and so on. The composition is more preferably used as a sealant or an adhesive, among the above-mentioned materials, since the cured product obtained by curing the curable composition of the invention is excellent in flexibility and adhesiveness.

The curable composition can also be used for various articles, such as electrical/electronic part materials such as a solar cell rear face sealant, electrically insulating materials such as an insulating coating material for electric wires/cables, elastic adhesives, powdery paints, casting materials, medical rubber materials, medical adhesives, medical instrument sealants, food wrapping materials, joint sealants for outer packaging materials such as a siding board, coating materials, primers, electromagnetic-wave-shielding electro-conductive materials, thermally conductive materials, hot melt materials, electrical and electronic potting agents, films, gaskets, various molding materials, rust resisting/waterproof sealants for an end face (cut portion) of net-incorporated glass or laminated glass, and liquid sealants used in automobile parts, electrical parts, or various mechanical parts. Furthermore, the curable composition can adhere closely to various substrates such as glass, ceramic, wood, metal, and resin molded product substrates by itself or by aid of a primer; therefore, the curable composition can also be used as various types of sealing compositions or adhesive compositions. Moreover, the curable composition of the invention can be used as an adhesive for interior panels, an adhesive for exterior panels, a tile-laying adhesive, a stone-material-laying adhesive, a ceiling finishing adhesive, a floor finishing adhesive, a wall finishing adhesive, an adhesive for automobile panels, an electrical/electronic/precision instrument fabricating adhesive, a direct grading sealant, a sealant for double glazing, a sealant for the SSG method, or a sealant for working joints of a building.

EXAMPLES

The present invention will be specifically described with reference to Examples and Comparative Examples; however, the invention is not limited to these examples.

Synthesis Example 1

Propylen oxide was polymerized using polyoxypropylene diol having a molecular weight of about 2,000 as an initiator in the presence of a zinc hexacyanocobaltate glyme complex catalyst to yield a polypropylene oxide (P-1) having hydroxyl groups at its terminals and having a number-average molecular weight of about 25,500, which was a molecular weight in terms of polystyrene measured by use of an HLC-8120 GPC manufactured by Tosoh Corporation as a liquid-feeding system, a TSK-GEL H type column manufactured by Tosoh Corporation, and THF as a solvent. Subsequently, a solution of NaOMe in methanol was added thereto in an equivalent amount 1.2 times of the hydroxyl groups of this hydroxyl-group-terminated polypropylene oxide (P-1), and methanol was distilled off. Furthermore, allyl chloride was added thereto to convert the hydroxyl groups at the terminals into allyl groups. Unreacted allyl chloride was volatilized and removed under reduced pressure. Into 100 parts by weight of the resultant crude allyl-group-terminated polypropylene oxide were incorporated 300 parts by weight of n-hexane and 300 parts by weight of water were mixed, and then the mixture was stirred. Water was then removed therefrom by centrifugal separation. Furthermore, 300 parts by weight of water were incorporated into the resultant hexane solution, and then the mixture was stirred. Water was again removed therefrom by centrifugal separation, and then hexane was volatilized and removed under reduced pressure. This way gave an allyl-group-terminated bifunctional polypropylene oxide (P-2) having a number-average molecular weight of about 25,500.

100 parts by weight of the resultant allyl-group-terminated polypropylene oxide (P-2), which was yielded in Synthesis Example 1, were reacted with 1.1 parts by weight of trimethyoxysilane in the presence of 150 ppm of a solution of a platinum vinylsiloxane complex having a platinum content of 3% by weight in isopropanol as a catalyst at 90° C. for 5 hours, to yield a trimethoxysilyl-group-terminated polyoxypropylene polymer (A-1). According to measurement by $^1$H-NMR (in a CDCl$_3$ solvent by use of JNM-LA400 manufactured by JEOL Ltd.), the number of the trimethoxysilyl groups at the terminals was 1.3 per molecule on average.

Synthesis Example 2

To 100 parts by weight of the hydroxyl-group-terminated polypropylene oxide (P-1), which was yielded in Synthesis Example 1, were added 1.8 parts by weight of γ-isocyanatepropyltrimethoxysilane, and the components were reacted with each other at 90° C. for 5 hours to yield a trimethoxysilyl-group-terminated polyoxypropylene polymer (A-2) having urethane bonds as a main chain skeleton. According to the same $^1$H-NMR measurement as in Synthesis Example 1, the number of the trimethoxysilyl groups at the terminals was 1.3 per molecule on average.

Synthesis Example 3

100 parts by weight of the allyl-group-terminated polypropylene oxide (P-2), which was yielded in Synthesis Example 1, were reacted with 0.9 part by weight of methyldimethoxysilane in the presence of 150 ppm of a solution of a platinum vinylsiloxane complex having a platinum content of 3% by weight in isopropanol at 90° for 5 hours, to yield a methyldimethoxysilyl-group-terminated polyoxypropylene polymer (A-3). According to the same $^1$H-NMR measurement as in Synthesis Example 1, the number of the methyldimethoxysilyl groups at the terminals was 1.3 per molecule on average.

Example 1

The following were weighed: 50 parts by weight of precipitated glue calcium carbonate (trade name: HAKUENKA CCR, manufactured by Shiraishi Kogyo Kaisha, Ltd.), 50 parts by weight of ground calcium carbonate (trade name: WHITON-SB, manufactured by Shiraishi Calcium Kaisha, Ltd.), 2 parts by weight of an anti-sagging agent (trade name: Disparlon 6500, manufactured by Kusumoto Chemicals, Ltd.), and 1 part by weight of a hindered phenol antioxidant (trade name: Irganox 1010, manufactured by Ciba Specialty Chemicals Inc.). These were then blended with 100 parts by weight of the trimethoxysilyl-group-terminated polyoxypropylene polymer (A-1), which was yielded in Synthesis Example 1. The resultant blend was sufficiently kneaded. Then, the mixture was passed 3 times through a three-axis paint roll to disperse the solid components. Thereafter, the resultant was dehydrated under reduced pressure at 120° C. for 2 hours, and then cooled to 50° C. or lower. Thereto were then added 5 parts by weight of γ-aminopropyltrimethoxysilane (trade name: A-1110, manufactured by Nippon Unicar Co., Ltd.) as an adhesion-imparting agent, 3 parts by weight of γ-glycidoxypropyltrimethoxysilane (trade name: A-187, manufactured by Nippon Unicar Co., Ltd.) as an adhesion-imparting agent, 2.5 parts by weight of neodecanoic acid (trade name: Versatic 10, manufactured by Japan Epoxy Resins Co., Ltd.), which is a carboxylic acid, as a curing catalyst, and 0.5 part by weight of 3-diethylaminopropylamine (manufactured by Wako Pure Chemical Industries, Ltd., and abbreviated to DEAPA) as an amine, and then the components were mixed. The mixture was kneaded in a substantial absence of water, and then put air-tightly into a moisture-proof container to yield a one-component curable composition. The molecular weight of the A1110 as the component (D) was 179.3, and the A-187 as the component (E) was 236.3; therefore, the ratio of (d)/(e), which is the ratio of the molar number (d) of all amino groups of the components (D) to the molar number (e) of all epoxy groups of the component (E), was 2.2.

Example 2

A curable composition was yielded in the same way as in Example 1 except that the use amount of the A-1110 in Example 1 was changed to 3.6 parts by weight and the use amount of the A-187 was changed to 4.7 parts by weight. The ratio of (d)/(e), which is the ratio of the molar number (d) of all amino groups of the components (D) to the molar number (e) of all epoxy groups of the component (E), was 1.0.

Example 3

A curable composition was yielded in the same way as in Example 1 except that instead of the polymer (A-1) in Example 1, 100 parts by weight of the trimethoxysilyl-group-terminated polyoxypropylene polymer (A-2), which was yielded in Synthesis Example 2, were used. The ratio of (d)/(e), which is the ratio of the molar number (d) of all amino groups of the components (D) to the molar number (e) of all epoxy groups of the component (E), was 2.2.

Example 4

A curable composition was yielded in the same way as in Example 1 except that instead of the A-1110 in Example 1, 6.2 parts by weight of γ-(2-aminoethyl)aminopropyltrimethoxysilane (trade name: A-1120, manufactured by Nippon Unicar Co., Ltd.) were used. Since the molecular weight of the A-1120 was 222.1, the ratio of (d)/(e), which is the ratio of the molar number (d) of all amino groups of the components (D) to the molar number (e) of all epoxy groups of the component (E), was 2.2.

Example 5

A curable composition was yielded in the same way as in Example 1 except that instead of the carboxylic acid in Example 2, 3.4 parts by weight of tin neodecanoate (trade name: NEOSTANN U-50, manufactured by Nitto Kasei Co., Ltd.) as a carboxylic acid tin salt were used. The ratio of (d)/(e), which is the ratio of the molar number (d) of all amino groups of the components (D) to the molar number (e) of all epoxy groups of the component (E), was 1.0.

Example 6

A curable composition was yielded in the same way as in Example 1 except that instead of the polymer (A-1) in Example 2, 100 parts by weight of the methyldimethoxysilyl-group-terminated polyoxypropylene polymer (A-3), which was yielded in Synthesis Example 3, were used. The ratio of (d)/(e), which is the ratio of the molar number (d) of all amino groups of the components (D) to the molar number (e) of all epoxy groups of the component (E), was 1.0.

Comparative Example 1

A curable composition was yielded in the same way as in Example 1 except that instead of the A-187 in Example 4, 3 parts by weight of vinylsilane (trade name: A-171, manufactured by Nippon Unicar Co., Ltd.) were used. In the present example, the component (E) was not used.

Comparative Example 2

A curable composition was yielded in the same way as in Example 1 except that the A-1110 in Example 3 was not used and further the use amount of the A-187 was changed to 9.4 parts by weight. In the present example, the component (D) was not used.

Comparative Example 3

A curable composition was yielded in the same way as in Example 1 except that the use amount of the A-1110 in Example 1 was changed to 2.3 parts by weight and further the use amount of the A-187 was changed to 6.6 parts by weight. The ratio of (d)/(e), which is the ratio of the molar number (d) of all amino groups of the components (D) to the molar number (e) of all epoxy groups of the component (E), was 0.5.

Comparative Example 4

A curable composition was yielded in the same way as in Example 1 except that instead of the polymer (A-1) in Comparative Example 3, 100 parts by weight of the trimethoxysilyl-group-terminated polyoxypropylene polymer (A-2), which was yielded in Synthesis Example 2, were used. The ratio of (d)/(e), which is the ratio of the molar number (d) of all amino groups of the components (D) to the molar number (e) of all epoxy groups of the component (E), was 0.5.

Comparative Example 5

A curable composition was yielded in the same way as in Example 1 except that the use amount of the A-1110 in Example 5 was changed to 3 parts by weight and further the use amount of the A-187 was changed to 2 parts by weight. In the present example, the total molar number of the component (D) and the component (E) was 25.2 mmol.

Comparative Example 6

A curable composition was yielded in the same way as in Example 1 except that 3-diethylaminopropylamine in Example 1 was not used. In the present Example, the component (C) was not contained.

Each of the curable compositions obtained in Examples 1 to 6 and Comparative Examples 1 to 6 was used to make measurement and evaluation about various physical properties thereof as described below. About initial physical properties thereof, a one-compartment curable composition was produced and was allowed to stand still at 23° C. and 50% R.H. for 7 to 14 days and then the individual physical properties thereof were evaluated.

(Curability)

The above-mentioned curable compositions were each elongated at 23° C. and 50% R.H. so as to have a thickness of about 3 mm, and a micro-spatula was used to touch the surface of the curable composition occasionally. In this way, a time until the composition came not to adhere to the micro-spatula was measured. The results are shown in Table 1.

(Curability after Storage)

In order to evaluate the storage stability of each of the one-component compositions, the composition was put into a drying machine of 50° C. temperature for 28 days, and was allowed to stand still at 23° C. and 50% R. H. for 1 day or more. Thereafter, the curability was evaluated in the same way as described above, and the resultant value was compared with the initial value. A case where the value of the curability after the storage was a value not changed at all from the initial curability (the retardation ratio: 1.0) is represented by ⊙, a case where the retardation ratio was from 1.1 to 1.3 is represented by ◯, a case where the retardation ratio was from 1.4 to 3.0 is represented by ∆, and a case where the retardation ratio was larger than 3.0 is represented by X.

(Adhesiveness of the Cured Product)

Each of the curable compositions was put onto each of various substrates (an anodized aluminum, a stainless steel plate, a piece of glass and an acrylic plate) so as to adhere closely thereon. The resultant was allowed to stand still for curing in a thermostat of 23° C. temperature and 50% RH humidity for 7 days, and then a razors edge was used to make a cut into the interface between the cured product and the substrate, and the cured product was pulled into a 90-degree direction. Thereafter, the failure state of the cured product was observed, and the cohesion failure rate (CF rate) was measured.

The results are shown in Table 1. In the table, a case where the CF rate was 100% is represented by ⊙, a case where the CF rate was less than 100% and 50% or more is represented by ◯, a case where the CF rate was less than 50% and 10% or more is represented by ∆, and a case where the CF rate was less than 10% is represented by X.

TABLE 1

| | | | Examples | | | | | | Comparative Examples | | | | | |
|---|---|---|---|---|---|---|---|---|---|---|---|---|---|---|
| | | | 1 | 2 | 3 | 4 | 5 | 6 | 1 | 2 | 3 | 4 | 5 | 6 |
| (A) Organic polymer | | A-1(g) | 100 | 100 | | 100 | 100 | | 100 | | 100 | | 100 | 100 |
| | | A-2(g) | | | 100 | | | | | 100 | | 100 | | |
| | | A-3(g) | | | | | | 100 | | | | | | |
| (B) Carboxylic acid (b1) | | Versatic10 (g) | 2.5 | 2.5 | 2.5 | 2.5 | | 2.5 | 2.5 | 2.5 | 2.5 | 2.5 | | 2.5 |
| Metal salt of Carboxylic acid (b2) | | NEOSTANN U-50 (g) | | | | | 3.4 | | | | | | 3.4 | |
| (C) Amine compound | | DEAPA(g) | 0.5 | 0.5 | 0.5 | 0.5 | 0.5 | 0.5 | 0.5 | 0.5 | 0.5 | 0.5 | 0.5 | |
| (D) Aminosilane | | A-1110(Mw = 179.3)(g) | 5 | 3.6 | 5 | | 3.6 | 3.6 | | | 2.3 | 2.3 | 3 | 5 |
| | | A-1120(Mw = 222.1)(g) | | | | 6.2 | | | | 6.2 | | | | |
| (E) Epoxysilane | | A-187(Mw = 236.3)(g) | 3 | 4.7 | 3 | 3 | 4.7 | 4.7 | | 9.4 | 6.6 | 6.6 | 2 | 3 |
| Vinylsilane | | A-171(g) | | | | | | | 3 | | | | | |
| Filler | | HAKUENKA CCR (g) | 50 | 50 | 50 | 50 | 50 | 50 | 50 | 50 | 50 | 50 | 50 | 50 |
| | | WHITON-SB (g) | 50 | 50 | 50 | 50 | 50 | 50 | 50 | 50 | 50 | 50 | 50 | 50 |
| Anti-sagging | | Disparlon 6500 (g) | 2 | 2 | 2 | 2 | 2 | 2 | 2 | 2 | 2 | 2 | 2 | 2 |
| Antioxidant | | IRGANOX 1010 (g) | 1 | 1 | 1 | 1 | 1 | 1 | 1 | 1 | 1 | 1 | 1 | 1 |
| Molar quantity of the (D) (mmol) | | | 27.9 | 20.1 | 27.9 | 27.9 | 20.1 | 20.1 | 27.9 | 0 | 12.8 | 12.8 | 16.7 | 27.9 |
| Molar quantity of the (E) (mmol) | | | 12.7 | 19.9 | 12.7 | 12.7 | 19.9 | 19.9 | 0 | 39.8 | 27.9 | 27.9 | 8.5 | 12.7 |

TABLE 1-continued

|  |  | Examples | | | | | | Comparative Examples | | | | | |
|---|---|---|---|---|---|---|---|---|---|---|---|---|---|
|  |  | 1 | 2 | 3 | 4 | 5 | 6 | 1 | 2 | 3 | 4 | 5 | 6 |
| Total molar quantity of the (D) + the (E) (mmol) | | 40.6 | 40.0 | 40.6 | 40.6 | 40.0 | 40.0 | 27.9 | 39.8 | 40.7 | 40.7 | 25.2 | 40.6 |
| Molar number (d) of all amino groups of the (D) per molar number (e) of all epoxy groups of the (E) | | 2.2 | 1.0 | 2.2 | 4.4 | 1.0 | 1.0 | — | 0 | 0.5 | 0.5 | 2.0 | 2.2 |
| Curability | Initial Curing time (minutes) . . . x | 50 | 70 | 40 | 45 | 45 | 150 | 50 | 60 | 70 | 60 | 40 | Not cured |
|  | Curing time (minutes) after the storage . . . y | 50 | 85 | 40 | 45 | 50 | 160 | 50 | 720 | 140 | 135 | 40 | Not cured |
|  | Retardation ratio . . . y/x | 1.0 | 1.2 | 1.0 | 1.0 | 1.1 | 1.1 | 1.0 | 12.0 | 2.0 | 2.3 | 1.0 | — |
|  | Evaluation of the curability after the storage | ⊙ | ○ | ⊙ | ⊙ | ○ | ○ | ⊙ | X | Δ | Δ | ○ | — |
| Adhesiveness | Anodic oxidation aluminum | ⊙ | ⊙ | ⊙ | ⊙ | ⊙ | ⊙ | X | ⊙ | ⊙ | ⊙ | X |  |
|  | Stainless steel plate | ⊙ | ⊙ | ⊙ | ⊙ | ⊙ | ⊙ | X | X | ⊙ | ⊙ | X |  |
|  | Glass | ⊙ | ⊙ | ⊙ | ⊙ | ⊙ | ⊙ | X | ⊙ | ⊙ | ⊙ | ⊙ |  |
|  | Acrylic plate | ⊙ | ⊙ | ⊙ | ⊙ | ⊙ | ⊙ | ⊙ | X | ⊙ | ⊙ | X |  |
| Comprehensive adhesiveness evaluation | | ⊙ | ⊙ | ⊙ | ⊙ | ⊙ | ⊙ | X | Δ | ⊙ | ⊙ | X |  |

As shown in Examples 1 to 6, cases where the components (D) and (E) as adhesion-imparting agents are used together with the components (A) to (C), the ratio of (d)/(e) of the molar number (d) of all amino groups of the component (D) to the molar number (e) of all epoxy groups of the component (E) is 1 or more, and further the total amount of the components (D) and the (E) per 100 g of the component (A) is 30 mmol or more are good in adhesiveness to the substrates, and are good in curability after the storage, the value thereof being less varied from the initial value. Comparative Example 1, which does not contain the component (E), is poor in adhesiveness to the substrates. Comparative Example 2, which does not contain the component (D), is insufficient in storage stability since the curability after the storage is largely lower than the initial curability. In Comparative Examples 3 and 4, wherein the components (D) and (E) are used together but the ratio of (d)/(e) of the molar number (d) of all amino groups of the component (D) to the molar number (e) of all epoxy groups of the component (E) is less than 1, the adhesiveness to the substrates is good. However, the curability after the storage is lower than the initial curability; thus, the storage stability is bad. In Comparative Example 5, wherein the total molar number of the components (D) and (E) is as small as 25.2 mmol, the adhesiveness to the substrates is poor. Comparative Example 6, which does not contain the amine compound of the component (C), is not cured at all even after a lapse of 7 days at room temperature.

What is claimed is:

1. A one-component curable composition comprising:
   (A) an organic polymer having silicon-containing group(s) which can be crosslinked by the formation of a siloxane bond;
   (B) a carboxylic acid and/or a metal salt of a carboxylic acid;
   (C) an amine compound having no reactive silicon group;
   (D) an amino-group-substituted silane compound; and
   (E) an epoxy-group-substituted silane compound,
   wherein the main chain skeleton of the organic polymer of the component (A) is at least one polymer selected from the group consisting of a polyoxyalkylene polymer and an alkyl (meth)acrylate polymer, and
   wherein the ratio of the molar number (d) of all amino groups of the amino-group-substituted silane compound (D) contained in the composition to the molar number (e) of all epoxy groups of the epoxy-group-substituted silane compound (E) contained in the composition i.e., the ratio of (d)/(e), is 1 or more, and further the total amount of the component (D) and the component (E) with respect to 100 g of the component (A) is 40 mmol or more.

2. The curable composition of claim 1, wherein the polyoxyalkylene polymer is polyoxypropylene polymer.

3. The curable composition of claim 1, wherein the component (B) comprises (b1) carboxylic acid in which a carbon atom adjacent to a carbonyl group is a quaternary carbon and/or (b2) the metal salt of a carboxylic acid in which a carbon atom adjacent to a carbonyl group is a quaternary carbon.

4. The curable composition of claim 3, wherein said (b2) the metal salt of a carboxylic acid in which a carbon atom adjacent to a carbonyl group is a quaternary carbon, is tin carboxylate.

5. The curable composition of claim 1, wherein the main chain skeleton of the organic polymer of the component (A) is a urethane- or urea-containing polyoxyalkylene polymer.

6. A one-component adhesive including the curable composition of claim 1.

7. A one-component-sealant including the curable composition of claim 1.

* * * * *